US011824276B2

(12) United States Patent
Cha et al.

(10) Patent No.: US 11,824,276 B2
(45) Date of Patent: Nov. 21, 2023

(54) ELECTRONIC DEVICE FOR ADJUSTING ANTENNA CONFIGURATION AND METHOD FOR OPERATING SAME

(71) Applicant: SAMSUNG ELECTRONICS CO., LTD., Suwon-si (KR)

(72) Inventors: Jaemoon Cha, Suwon-si (KR); Kukjeong Kim, Suwon-si (KR); Yeonjoo Lee, Suwon-si (KR); Woohyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 16/907,826

(22) Filed: Jun. 22, 2020

(65) Prior Publication Data
US 2021/0050669 A1 Feb. 18, 2021

(30) Foreign Application Priority Data

Aug. 14, 2019 (KR) .......................... 10-2019-0099799

(51) Int. Cl.
H04B 1/40 (2015.01)
H04B 17/12 (2015.01)
(Continued)

(52) U.S. Cl.
CPC .............. H01Q 5/314 (2015.01); H01Q 5/10 (2015.01); H04B 1/18 (2013.01)

(58) Field of Classification Search
None
See application file for complete search history.

(56) References Cited

U.S. PATENT DOCUMENTS 7,356,309 B2 *  4/2008  Fifield ................... H04B 17/18
                                                         455/39
8,626,083 B2 *  1/2014  Greene ................. H01Q 5/314
                                                         343/745
(Continued)

FOREIGN PATENT DOCUMENTS

CN      102484893 A     5/2012
CN      102544754 A     7/2012
(Continued)

OTHER PUBLICATIONS

International Search Report and Written Opinion dated Sep. 25, 2020 in corresponding International Application No. PCT/KR2020/008205.

(Continued)

Primary Examiner — Tuan A Tran
(74) Attorney, Agent, or Firm — Nixon & Vanderhye P.C.

(57) ABSTRACT

An electronic device according to various embodiments includes: at least one communication processor configured to support a plurality of network communications, a shared antenna configured to transmit at least one communication signal corresponding to the plurality of network communications, an antenna tuning circuit configured to adjust resonance characteristics of the shared antenna, and a memory configured to store a plurality of antenna configurations applied to the antenna tuning circuit, wherein the at least one communication processor is configured to: identify a plurality of target power values corresponding to the plurality of network communication, respectively, identify a first antenna configuration of the antenna tuning circuit to minimize the power consumption among the plurality of antenna configurations stored in the memory based on the at least one communication signal being transmitted through the shared antenna, based on the plurality of target power values, and (Continued)

apply the first antenna configuration to the antenna tuning circuit.

11 Claims, 24 Drawing Sheets

(51) Int. Cl.
*H04W 52/36* (2009.01)
*H01Q 5/314* (2015.01)
*H01Q 5/10* (2015.01)
*H04B 1/18* (2006.01)

(56) References Cited

U.S. PATENT DOCUMENTS

| | | | |
|---|---|---|---|
| 9,160,395 B2* | 10/2015 | Lei | H04W 52/0251 |
| 9,392,558 B2* | 7/2016 | See | H04W 52/367 |
| 10,381,715 B2* | 8/2019 | Han | H04W 4/026 |
| 10,693,516 B2* | 6/2020 | Han | H04W 52/367 |
| 11,323,158 B2* | 5/2022 | Brunel | H04W 52/42 |
| 2005/0215287 A1 | 9/2005 | Efland et al. | |
| 2006/0183431 A1 | 8/2006 | Chang et al. | |
| 2006/0281423 A1 | 12/2006 | Caimi et al. | |
| 2007/0002759 A1* | 1/2007 | Diaz | H04W 24/02 370/252 |
| 2011/0206165 A1 | 8/2011 | Satou et al. | |
| 2011/0244917 A1 | 10/2011 | Chiou et al. | |
| 2012/0127056 A1 | 5/2012 | Park et al. | |
| 2013/0005277 A1 | 1/2013 | Klomsdorf et al. | |
| 2013/0154897 A1 | 6/2013 | Sorensen et al. | |
| 2014/0273887 A1 | 9/2014 | Black et al. | |
| 2015/0230206 A1 | 8/2015 | Tabet et al. | |
| 2015/0305035 A1 | 10/2015 | Hu et al. | |
| 2015/0373714 A1 | 12/2015 | Paik | |
| 2016/0036482 A1* | 2/2016 | Black | H04B 1/0458 455/77 |
| 2016/0127993 A1 | 5/2016 | Wang | |
| 2016/0134016 A1 | 5/2016 | Hsu et al. | |
| 2016/0380665 A1 | 12/2016 | Lee et al. | |
| 2016/0381618 A1 | 12/2016 | Sayem et al. | |
| 2017/0033829 A1 | 2/2017 | HomChaudhuri et al. | |
| 2017/0272108 A1 | 9/2017 | Filipovic et al. | |
| 2017/0338562 A1 | 11/2017 | Ozenne et al. | |
| 2019/0052302 A1 | 2/2019 | Lee et al. | |

FOREIGN PATENT DOCUMENTS

| | | |
|---|---|---|
| CN | 103178327 A | 6/2013 |
| CN | 105024726 A | 11/2015 |
| CN | 105187180 A | 12/2015 |
| CN | 107078749 A | 8/2017 |
| CN | 107453790 A | 12/2017 |
| CN | 107710863 A | 2/2018 |
| CN | 110086480 A | 8/2019 |
| EP | 3247049 | 11/2017 |
| KR | 10-2014-0082865 | 7/2014 |

OTHER PUBLICATIONS

Partial supplementary search report dated Jul. 15, 2022 in counterpart European Patent Application No. EP20852976.8.
Extended European Search Report dated Nov. 2, 2022 for EP Application No. 20852976.8.
Chinese Office Action dated Feb. 10, 2023 for CN Application No. 202080057516.3.
Cai et al., A Power Allocation Strategy for Multiple Poisson Spectrum-Sharing Networks; IEEE Transactions On Wireless Communications, vol. 14, No. 4, Apr. 2015; 15pgs.
Wang et al.; Research on the Application of Multi-Standard Radio Base Station; China Unicom Research Institute; Sep. 1, 2012.
Chinese Notice of Allowance dated Jul. 28, 2023 for CN Application No. 202080057516.3.

* cited by examiner

| Antenna tuner | aperture tuner | Radiation/conduction power | | 20 | 0 | SUM | 15 | 12 | SUM | 10 | 13 | SUM | 0 | 20 | SUM |
|---|---|---|---|---|---|---|---|---|---|---|---|---|---|---|---|
| impedance tuner | | N71 | B2 | N71 | B2 | | N71 | B2 | | N71 | B2 | | N71 | B2 | |
| | | | | | | 901 | | | 902 | | | 903 | | | 904 |
| 1 | a | 0.9 | 0.7 | 90.000 | 0.700 | 90.7 | 28.460 | 11.094 | 39.555 | 9.000 | 13.967 | 22.967 | 9.000 | 70.000 | 70.900 |
| | b | 0.85 | 0.83 | 85.000 | 0.830 | 85.83 | 26.879 | 13.155 | 40.034 | 8.500 | 16.561 | 25.061 | 8.500 | 83.000 | 83.850 |
| | c | 0.7 | 0.9 | 70.000 | 0.900 | 70.9 | 22.136 | 14.264 | 36.400 | 7.000 | 17.957 | 24.957 | 7.000 | 90.000 | 90.700 |
| | d | 0.6 | 0.8 | 60.000 | 0.800 | 60.8 | 18.974 | 12.679 | 31.653 | 6.000 | 15.962 | 21.962 | 6.000 | 80.000 | 80.600 |
| 2 | a | 0.5 | 0.7 | 50.000 | 0.700 | 50.7 | 15.811 | 11.904 | 26.906 | 5.000 | 13.967 | 18.967 | 5.000 | 70.000 | 70.500 |
| | b | 0.4 | 0.5 | 40.000 | 0.500 | 40.5 | 12.649 | 7.924 | 20.574 | 4.000 | 9.976 | 13.976 | 4.000 | 50.000 | 50.400 |
| | c | 0.3 | 0.8 | 30.000 | 0.800 | 30.8 | 9.487 | 12.679 | 22.166 | 3.000 | 15.962 | 18.962 | 3.000 | 80.000 | 80.300 |
| | d | 0.2 | 0.9 | 20.000 | 0.900 | 20.9 | 6.325 | 14.264 | 20.589 | 2.000 | 17.957 | 19.957 | 2.000 | 90.000 | 90.200 |
| 3 | a | 0.1 | 0.7 | 10.000 | 0.700 | 10.7 | 3.162 | 11.094 | 14.257 | 1.000 | 13.697 | 14.967 | 1.000 | 70.000 | 70.100 |
| | b | 0.5 | 0.4 | 50.000 | 0.500 | 50.5 | 15.811 | 7.924 | 23.736 | 5.000 | 9.976 | 14.976 | 5.000 | 50.000 | 50.500 |
| | c | 0.6 | 0.4 | 60.000 | 0.400 | 60.4 | 18.974 | 6.340 | 25.313 | 6.000 | 7.981 | 13.981 | 6.000 | 40.000 | 40.600 |
| | d | 0.7 | 0.3 | 70.000 | 0.300 | 70.3 | 22.136 | 4.755 | 26.891 | 7.000 | 5.986 | 12.986 | 7.000 | 30.000 | 30.700 |
| 4 | a | 0.8 | 0.5 | 80.000 | 0.500 | 80.5 | 22.298 | 7.924 | 33.223 | 8.000 | 9.976 | 17.976 | 8.000 | 50.000 | 50.800 |
| | b | 0.4 | 0.8 | 40.000 | 0.800 | 40.8 | 12.649 | 12.679 | 25.328 | 4.000 | 15.962 | 19.962 | 4.000 | 80.000 | 80.400 |
| | c | 0.5 | 0.9 | 50.000 | 0.900 | 50.9 | 15.811 | 14.264 | 30.075 | 5.000 | 17.957 | 22.957 | 5.000 | 90.000 | 90.500 |
| | d | 0.7 | 0.7 | 70.000 | 0.700 | 70.7 | 22.136 | 11.094 | 33.230 | 7.000 | 13.967 | 20.967 | 7.000 | 70.000 | 70.700 |

FIG.9

| Antenna tuner | | Radiation/ conduction power | | BandWidth (Mhz) | | 20 | 0 | SUM | 15 | 12 | SUM | 10 | 13 | SUM | 20 | 0 | SUM |
|---|---|---|---|---|---|---|---|---|---|---|---|---|---|---|---|---|---|
| impedance tuner | apertuer tuner | N71 | B2 | N71 | B2 | N71 | B2 | | N71 | B2 | | N71 | B2 | | B2 | N71 | |
| 1 | a | 0.9 | 0.7 | 5 | 20 | 450.000 | 14.000 | 464 | 142.302 | 221.885 | 364.188 | 45.000 | 279.337 | 324.337 | 1400.000 | 4.500 | 1404.500 |
| 1 | b | 0.85 | 0.83 | 5 | 20 | 425.000 | 16.600 | 441.6 | 134.397 | 263.092 | 397.489 | 42.500 | 331.214 | 373.714 | 1660.000 | 4.250 | 1664.250 |
| 1 | c | 0.7 | 0.9 | 5 | 20 | 350.000 | 18.000 | 368 | 110.680 | 285.281 | 395.960 | 35.000 | 359.147 | 394.147 | 1800.000 | 3.500 | 1803.500 |
| 1 | d | 0.6 | 0.8 | 5 | 20 | 300.000 | 16.000 | 316 | 94.868 | 253.583 | 348.451 | 30.000 | 319.242 | 349.242 | 1600.000 | 3.000 | 1603.000 |
| 2 | a | 0.5 | 0.7 | 5 | 20 | 250.000 | 14.000 | 264 | 79.057 | 221.885 | 300.942 | 25.000 | 279.337 | 304.337 | 1400.000 | 2.500 | 1402.500 |
| 2 | b | 0.4 | 0.5 | 5 | 20 | 200.000 | 10.000 | 210 | 63.246 | 158.489 | 221.735 | 20.000 | 199.526 | 219.526 | 1000.000 | 2.000 | 1002.000 |
| 2 | c | 0.3 | 0.8 | 5 | 20 | 150.000 | 16.000 | 166 | 47.434 | 253.583 | 301.017 | 15.000 | 319.242 | 334.242 | 1600.000 | 1.500 | 1601.500 |
| 2 | d | 0.2 | 0.9 | 5 | 20 | 100.000 | 18.000 | 118 | 31.623 | 285.281 | 316.904 | 10.000 | 359.147 | 369.147 | 1800.000 | 1.000 | 1801.000 |
| 3 | a | 0.1 | 0.7 | 5 | 20 | 50.000 | 14.000 | 64 | 15.811 | 221.885 | 237.696 | 5.000 | 279.337 | 284.337 | 1400.000 | 0.500 | 1400.500 |
| 3 | b | 0.5 | 0.4 | 5 | 20 | 250.000 | 10.000 | 260 | 79.057 | 158.489 | 237.546 | 25.000 | 199.526 | 224.526 | 1000.000 | 2.500 | 1002.500 |
| 3 | c | 0.6 | 0.4 | 5 | 20 | 300.000 | 8.000 | 308 | 94.868 | 126.791 | 221.660 | 30.000 | 159.621 | 189.621 | 800.000 | 3.000 | 803.000 |
| 3 | d | 0.7 | 0.3 | 5 | 20 | 350.000 | 6.000 | 356 | 110.680 | 95.094 | 205.773 | 35.000 | 119.719 | 154.716 | 600.000 | 3.500 | 603.500 |
| 4 | a | 0.8 | 0.5 | 5 | 20 | 400.000 | 10.000 | 410 | 126.491 | 158.489 | 284.980 | 40.000 | 199.526 | 239.526 | 1000.000 | 4.000 | 1004.000 |
| 4 | b | 0.4 | 0.8 | 5 | 20 | 200.000 | 16.000 | 216 | 63.246 | 253.583 | 316.828 | 20.000 | 319.242 | 339.242 | 1600.000 | 2.000 | 1602.000 |
| 4 | c | 0.5 | 0.9 | 5 | 20 | 250.000 | 18.000 | 268 | 79.057 | 285.281 | 364.338 | 25.000 | 359.147 | 384.147 | 1800.000 | 2.500 | 1802.500 |
| 4 | d | 0.7 | 0.7 | 5 | 20 | 350.000 | 14.000 | 364 | 110.680 | 221.885 | 332.565 | 35.000 | 279.337 | 314.337 | 1400.000 | 3.500 | 1403.500 |

FIG.11

| Antenna tuner | aperture tuner | Radiation/conduction power | | FOR PAST N SECONDS RB | | 20 | 0 | SUM | 15 | 12 | SUM | 10 | 13 | SUM | 20 | 0 | SUM |
|---|---|---|---|---|---|---|---|---|---|---|---|---|---|---|---|---|---|
| impedance tuner | | N71 | B2 | N71 | B2 | N71 | B2 | | N71 | B2 | | N71 | B2 | | B2 | N71 | |
| 1 | a | 0.9 | 0.7 | 200 | 20 | 18000.000 | 14.000 | 18014 | 5693.100 | 221.885 | 5913.985 | 1800.000 | 279.337 | 2079.337 | 1400.000 | 180.000 | 1580.000 |
| | b | 0.85 | 0.83 | 200 | 20 | 17000.000 | 16.600 | 17016.6 | 5375.872 | 263.092 | 5638.964 | 1700.000 | 331.214 | 2031.214 | 1660.000 | 170.000 | 1830.000 |
| | c | 0.7 | 0.9 | 200 | 20 | 14000.000 | 18.000 | 14018 | 4427.189 | 285.281 | 4712.469 | 1400.000 | 359.147 | 1759.147 | 1800.000 | 140.000 | 1940.000 |
| | d | 0.6 | 0.8 | 200 | 20 | 12000.000 | 16.000 | 12016 | 3794.733 | 253.583 | 4048.316 | 1200.000 | 319.242 | 1519.242 | 1600.000 | 120.000 | 1720.000 |
| 2 | a | 0.5 | 0.7 | 200 | 20 | 10000.000 | 14.000 | 10014 | 3162.278 | 221.885 | 3384.163 | 1000.000 | 279.337 | 1279.337 | 1400.000 | 100.000 | 1500.000 |
| | b | 0.4 | 0.5 | 200 | 20 | 8000.000 | 10.000 | 8010 | 2529.822 | 158.489 | 2688.311 | 800.000 | 199.526 | 999.526 | 1000.000 | 80.000 | 1080.000 |
| | c | 0.3 | 0.8 | 200 | 20 | 6000.000 | 16.000 | 6016 | 1897.367 | 253.583 | 2150.950 | 600.000 | 319.242 | 919.242 | 1600.000 | 60.000 | 1660.000 |
| | d | 0.2 | 0.9 | 200 | 20 | 4000.000 | 18.000 | 4018 | 1264.911 | 285.281 | 1550.192 | 400.000 | 359.147 | 759.147 | 1800.000 | 40.000 | 1840.000 |
| 3 | a | 0.1 | 0.7 | 200 | 20 | 2000.000 | 14.000 | 2014 | 632.456 | 221.885 | 854.341 | 200.000 | 279.337 | 479.337 | 1400.000 | 20.000 | 1420.000 |
| | b | 0.5 | 0.4 | 200 | 20 | 10000.000 | 10.000 | 10010 | 3162.278 | 158.489 | 3320.767 | 1000.000 | 199.526 | 1199.526 | 1000.000 | 100.000 | 1100.000 |
| | c | 0.6 | 0.4 | 200 | 20 | 12000.000 | 8.000 | 12008 | 3794.733 | 126.791 | 3921.525 | 1200.000 | 159.621 | 1359.621 | 800.000 | 120.000 | 920.000 |
| | d | 0.7 | 0.3 | 200 | 20 | 14000.000 | 6.000 | 14006 | 4427.189 | 95.094 | 4522.282 | 1400.000 | 119.719 | 1519.716 | 600.000 | 140.000 | 740.000 |
| 4 | a | 0.8 | 0.5 | 200 | 20 | 16000.000 | 10.000 | 16010 | 5059.611 | 158.489 | 5218.134 | 1600.000 | 199.526 | 1799.526 | 1000.000 | 160.000 | 1160.000 |
| | b | 0.4 | 0.8 | 200 | 20 | 8000.000 | 16.000 | 8016 | 2529.822 | 253.583 | 2783.405 | 800.000 | 319.242 | 1119.242 | 1600.000 | 80.000 | 1680.000 |
| | c | 0.5 | 0.9 | 200 | 20 | 10000.000 | 18.000 | 10018 | 3162.278 | 285.281 | 3447.558 | 1000.000 | 359.147 | 1359.147 | 1800.000 | 100.000 | 1900.000 |
| | d | 0.7 | 0.7 | 200 | 20 | 14000.000 | 14.000 | 14014 | 4427.189 | 221.885 | 4649.074 | 1400.000 | 279.337 | 1679.337 | 1400.000 | 140.000 | 1540.000 |

FIG.14

ELECTRONIC DEVICE FOR ADJUSTING ANTENNA CONFIGURATION AND METHOD FOR OPERATING SAME

CROSS-REFERENCE TO RELATED APPLICATION

This application is based on and claims priority under 35 U.S.C. § 119 to Korean Patent Application No. 10-2019-0099799, filed on Aug. 14, 2019, in the Korean Intellectual Property Office, the disclosure of which is incorporated by reference herein in its entirety.

BACKGROUND

Field

The disclosure relates to an electronic device for adjusting an antenna configuration and a method of operating the same.

Description of Related Art

In order to meet the increasing demand for wireless data traffic after commercialization of the $4^{th}$ generation (4G) communication system, efforts for developing improved $5^{th}$ generation (5G) communication systems or pre-5G communication systems have been made. For this reason, the 5G communication system or the pre-5G communication system is called a "beyond 4G network" or a "post LTE system".

The 5G communication system may support communication using a Sub-6 GHz band and/or communication using a millimeter wave band. The sub-6 GHz band may include frequency range 1 (FR1), and at least some of the bands of FR1 have been used by other existing standards. The millimeter wave band may include frequency range 2 (FR2), and may be included in a range of 24.25 GHz to 52.6 GHz, for example. The sub-6 GHz band can provide a wider coverage than the millimeter wave band. The millimeter wave band can provide a wider bandwidth than the sub-6 GHz band.

The electronic device in a network that supports ENDC (LTE+NR) can perform transmission based on two network communications, and in particular, the electronic device can be operated based on an inter band combination. Technologies for supporting transmission based on two network communications in an electronic device in one antenna have been actively progressing. For example, transmission (e.g., 2 transmit (2tx)) in at least two adjacent bands may be possible through a shared antenna. For example, the electronic device may control both network communications to share a shared antenna, in some bands (e.g., B2/B66 band of LTE, N5/N71 band of NR) among DC band combinations defined in the 3GPP standard. For example, the electronic device may control both network communications to share a shared antenna in some bands among carrier aggregation (CA) bands defined in the 3GPP standard. For example, transmission (e.g., 2 transmit (2tx)) in at least two or more non-contiguous bands may be possible through a shared antenna. However, when two network communications share an antenna and an antenna tuning circuit, a method for determining an antenna configuration of the antenna tuning circuit in consideration of both network communications is needed.

SUMMARY

Embodiments of the disclosure provide an electronic device that determines an antenna configuration that can minimize and/or reduce power consumed by both network communications or maximize and/or increase data throughput of both network communications and a method of operating the same, when transmitting communication signals, based on two network communications.

An electronic device according to various example embodiments may include: at least one communication processor configured to support a plurality of network communications, a shared antenna configured to transmit at least one communication signal corresponding to the plurality of network communications, an antenna tuning circuit configured to adjust resonance characteristics of the shared antenna, and a memory configured to store a plurality of antenna configurations to be applied to the antenna tuning circuit, wherein the at least one communication processor may be configured to: identify a plurality of target power values corresponding to the plurality of network communications, respectively; identify a first antenna configuration of the antenna tuning circuit to maximize and/or increase the antenna efficiency among the plurality of antenna configurations stored in the memory based on the at least one communication signal being transmitted through the shared antenna, based on the plurality of target power values; and apply the first antenna configuration to the antenna tuning circuit.

According to various example embodiments, an electronic device may include: at least one communication processor configured to support a plurality of network communications, a shared antenna configured to transmit at least one communication signal corresponding to the plurality of network communications, an antenna tuning circuit configured to adjust resonance characteristics of the shared antenna, and a memory configured to store a plurality of antenna configurations to be applied to the antenna tuning circuit, wherein the at least one communication processor may be configured to: identify a plurality of resource blocks for a designated period corresponding to the plurality of the network communications, respectively; identify a first antenna configuration of the antenna tuning circuit to maximize and/or increase the data throughput among the plurality of antenna configurations stored in the memory, based on the at least one communication signal being transmitted through the shared antenna, based on the plurality of resource blocks; and apply the first antenna configuration to the antenna tuning circuit.

According to various example embodiments, it is possible to provide an electronic device that determines an antenna configuration that can minimize and/or reduce power consumed by both network communications or maximize and/or increase data throughput of both network communications, when transmitting communication signals based on two network communications and a method of operating the same.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 9 is a diagram illustrating example antenna efficiency and power consumption for each antenna configuration according to various embodiments;

FIG. 11 is a diagram illustrating example antenna efficiency and power consumption for each antenna configuration according to various embodiments;

FIG. 14 is a table illustrating an example operation of selecting an antenna configuration to enable maximum data throughput according to various embodiments;

DETAILED DESCRIPTION

Figure 1:
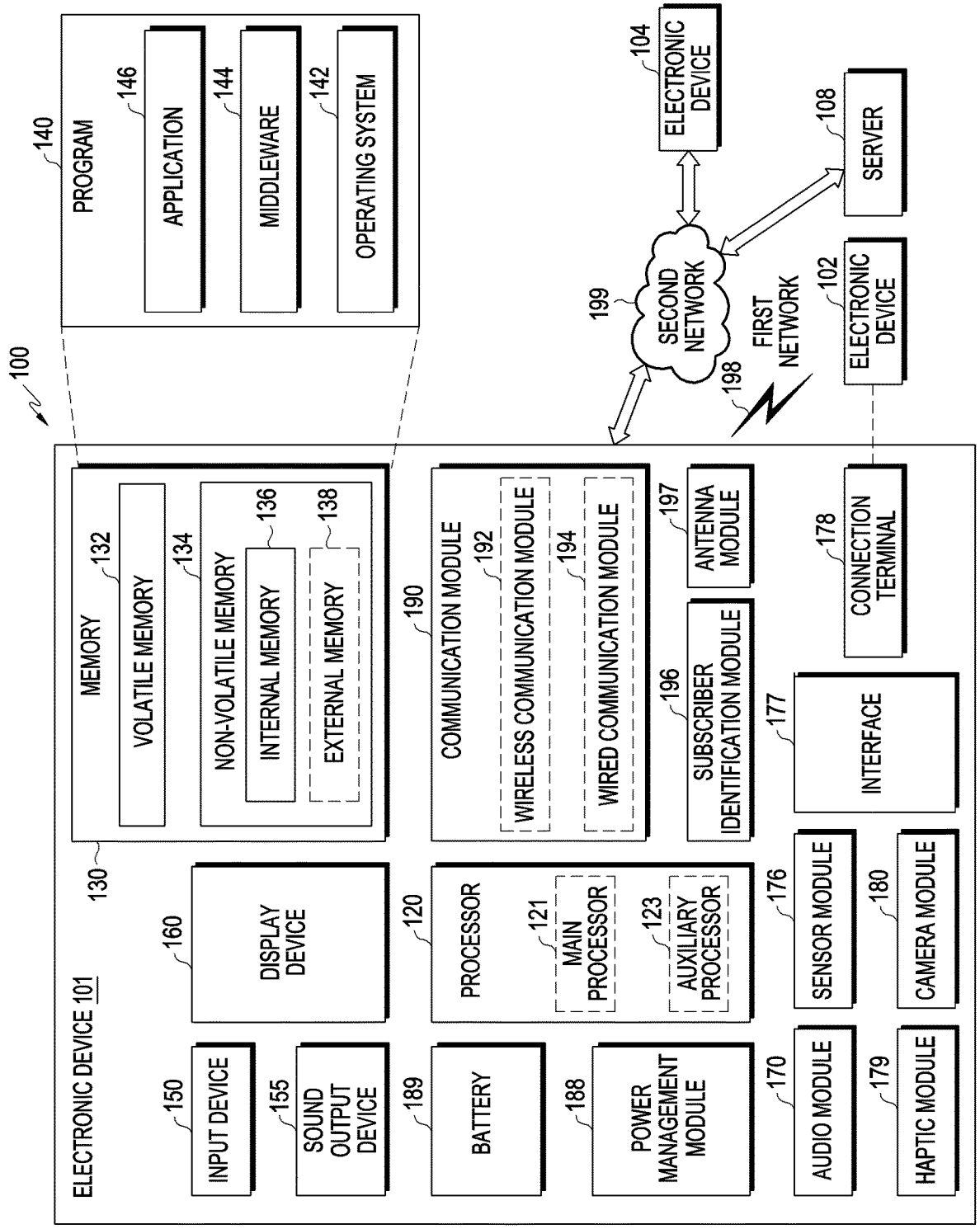
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
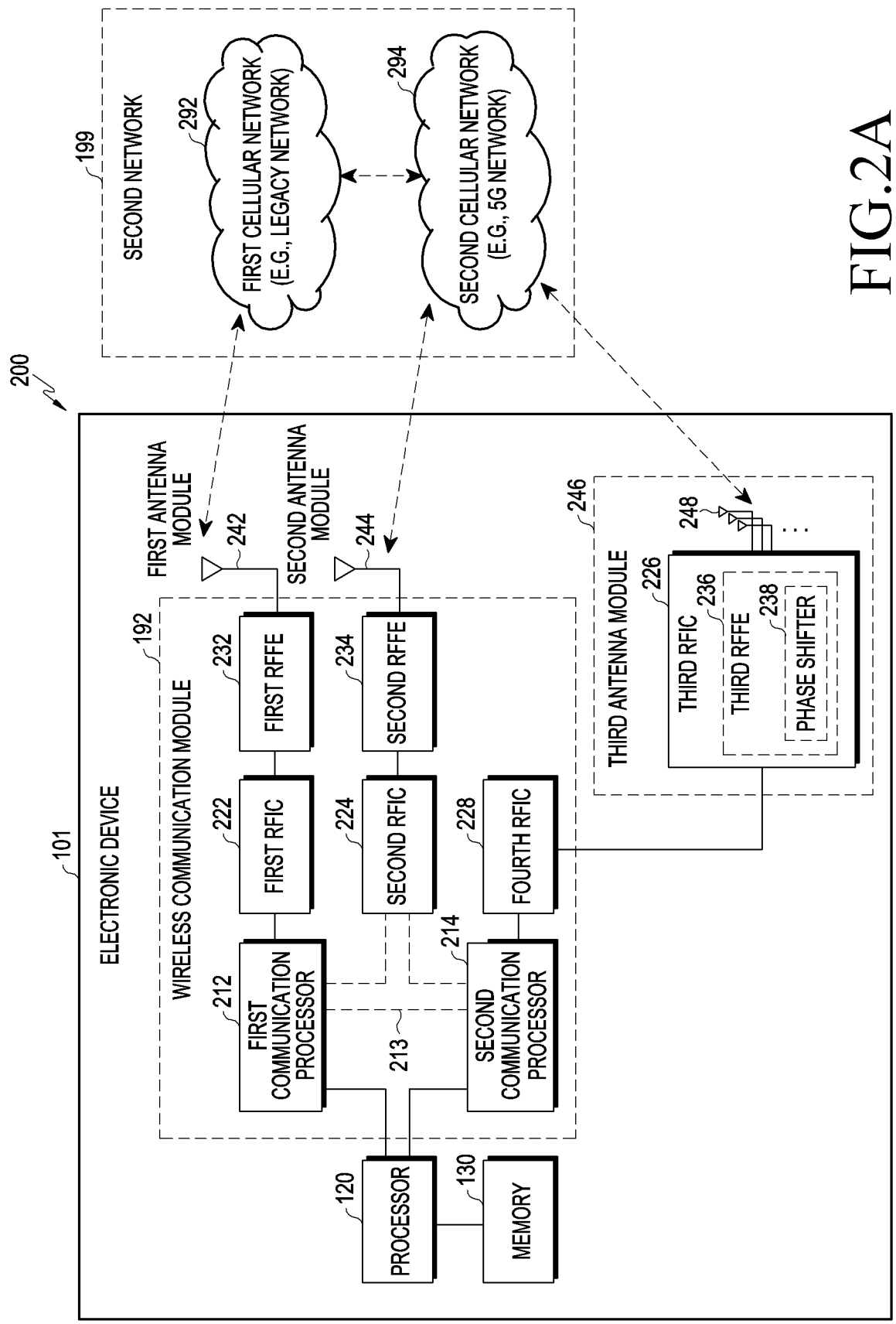
FIG. 2A is a block diagram illustrating an example electronic device for supporting network communication and 5G network communication according to various embodiments.
Figure 2B:
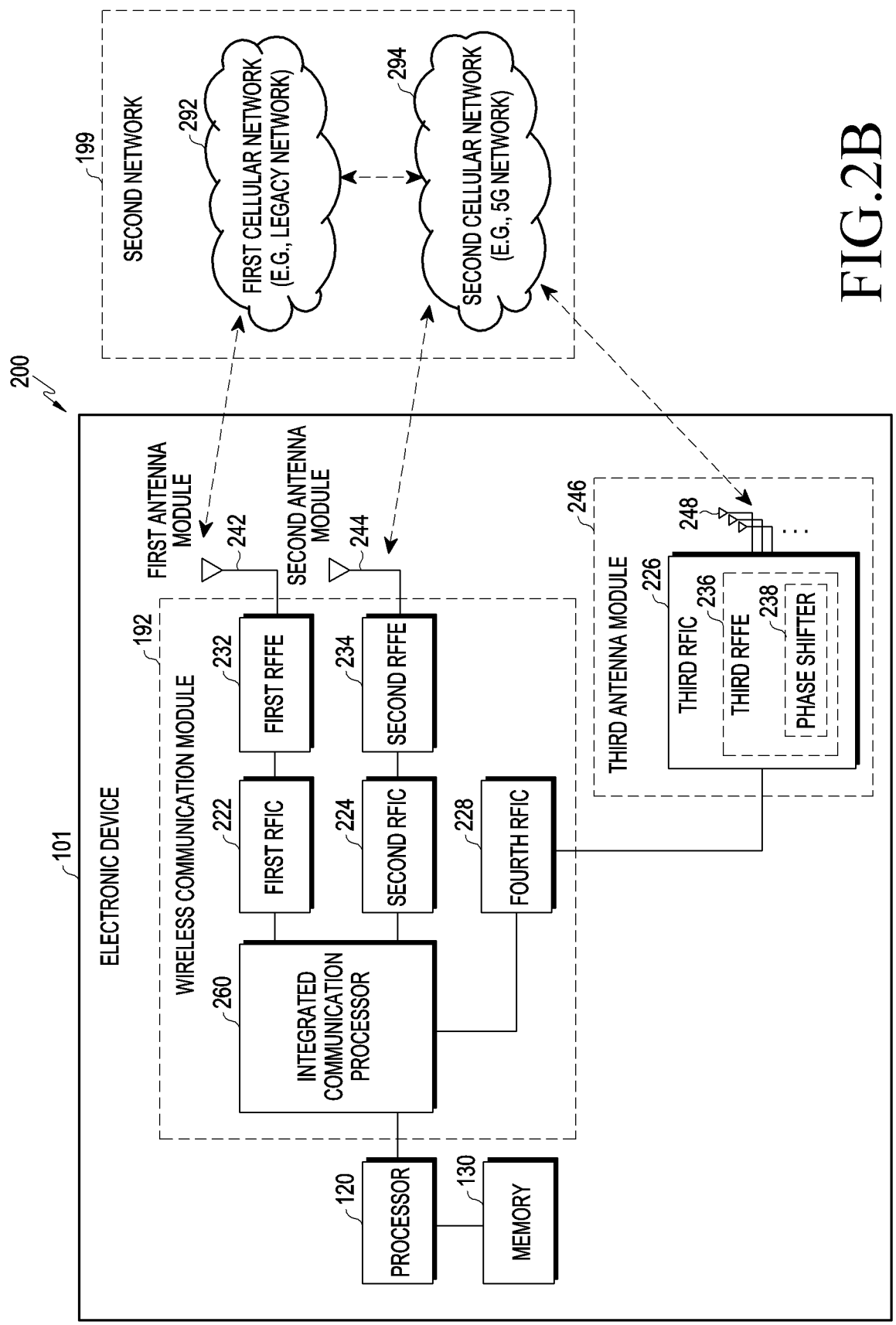
FIG. 2B is a block diagram illustrating an example electronic device for supporting network communication and 5G network communication according to various embodiments.

FIG. 2A is a block diagram 200 illustrating an example electronic device 101 for supporting network communication and 5G network communication according to various embodiments. FIG. 2B is a block diagram illustrating an example electronic device for supporting network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 199 may include a first network 292 and a second network 294. According another embodiment, the electronic device 101 may further include at least one component among components described in FIG. 1, and the network 199 may further at least one other network. According to an embodiment, the first communication processor 212, the second communication processor 214, the first RFIC 222, the second RFIC 224, the fourth RFIC 228, the first RFFE 232, the second RFFE 234 may form at least a part of a wireless communication module 192. According to another embodiment, the fourth RFIC 228 may be omitted or included as a part of the third RFIC 226.

The first communication processor 212 may include various processing circuitry and support the establishment of a communication channel in a band to be used for wireless communication with the first network 292 and legacy network communication through the established communication channel. According to various embodiments, the first network may be a legacy network including a second generation (2G), 3G, 4G, or long term evolution (LTE) network. The second communication processor 214 may support the establishment of a communication channel corresponding to a designated band (e.g., about 6 GHz to About 60 GHz) among bands to be used for wireless communication with the second network 294, and 5G network communication through the established communication channel. According to various embodiments, the second network 294 may be a 5G network defined by 3GPP. Additionally, according to an embodiment, the first communication processor 212 or the second communication processor 214 may support the establishment of a communication channel corresponding to another designated band (e.g., about 6 GHz or less) among bands to be used for wireless communication with the second network 294 and 5G network communication through the established communication channel.

The first communication processor 212 may transmit and receive data to and from the second communication processor 214. For example, data classified to be transmitted through the second cellular network 294 may be changed to be transmitted through the first cellular network 292. In this case, the first communication processor 212 may receive transmission data from the second communication processor 214.

For example, the first communication processor 212 may transmit and receive data through the second communication processor 214 and the interface 213 between the processors. The inter-processor interface 213 may be implemented with, for example, a universal asynchronous receiver/transmitter (UART) (e.g., high speed-UART (HS-UART) or peripheral component interconnect bus express (PCIe) interface), but there is no limit to the type. Alternatively, the first communication processor 212 and the second communication processor 214 may exchange control information and packet data information using, for example, a shared memory. The first communication processor 212 may transmit and receive various information, such as sensing information, information about output intensity, and resource block (RB) allocation information, with the second communication processor 214.

Depending on the implementation, the first communication processor 212 may not be directly connected to the second communication processor 214. In this case, the first communication processor 212 may transmit and receive data through the second communication processor 214 and the processor 120 (e.g., an application processor). For example, the first communication processor 212 and the second communication processor 214 may transmit and receive data through the processor 120 (e.g., an application processor) through an HS-UART interface or a PCIe interface, but there are no limit to the type. Alternatively, the first communication processor 212 and the second communication processor 214 may exchange control information and packet data information using a processor 120 (e.g., an application processor) and a shared memory.

According to an embodiment, the first communication processor 212 and the second communication processor 214 may be implemented in a single chip or a single package. According to various embodiments, the first communication processor 212 or the second communication processor 214 may be disposed in a single chip or a single package with the processor 120, the auxiliary processor 123, or the communication module 190. For example, as shown in FIG. 2B, the unified communication processor 260 may include various processing circuitry and support all functions for communication with the first cellular network and the second cellular network.

The first RFIC 222, when transmitting, may convert a baseband signal generated by the first communication processor 212 into a radio frequency (RF) signal of about from 700 MHz to about 3 GHz used in the first network 292 (e.g., a legacy network). Upon reception, an RF signal may be obtained from the first network 292 (e.g., legacy network) through an antenna (e.g., first antenna module 242), and may be preprocessed through an RFFE (e.g., first RFFE 232). The first RFIC 222 may convert the preprocessed RF signal into a baseband signal to be processed by the first communication processor 212.

The second RFIC 224, when transmitting, may convert the baseband signal generated by the first communication processor 212 or the second communication processor 214 into an RF signal (hereinafter, 5G Sub6 RF signal) in a Sub6 band (e.g., about 6 GHz or less) used in the second network 294 (e.g., 5G network). Upon reception, the 5G Sub6 RF signal may be obtained from the second network 294 (e.g., 5G network) through an antenna (e.g., second antenna module 244), and may be pre-processed through an RFFE (e.g., second RFFE 234). The second RFIC 224 may convert the pre-processed 5G Sub6 RF signal into a baseband signal to be processed by a corresponding communication processor among the first communication processor 212 or the second communication processor 214.

The third RFIC 226 may convert the baseband signal generated by the second communication processor 214 into an RF signal (hereinafter, 5G Above6 RF signal) of the 5G Above6 band (e.g., about 6 GHz to about 60 GHz) to be used in the second network 294 (e.g., 5G network). Upon reception, the 5G Above6 RF signal may be obtained from the second network 294 (e.g., 5G network) through an antenna (e.g., antenna 248), and may be pre-processed through the third RFFE 236. The third RFIC 226 may convert the pre-processed 5G Above6 RF signal into a baseband signal to be processed by the second communication processor 214. According to an embodiment, the third RFFE 236 may be disposed as a part of the third RFIC 226.

According to an embodiment, the electronic device 101 may include the fourth RFIC 228 separately from the third RFIC 226 or at least as a part thereof. In this case, the fourth RFIC 228 may convert the baseband signal generated by the second communication processor 214 into an RF signal (hereinafter, IF signal) of intermediate frequency band (e.g., about 9 GHz to about 11 GHz), and then transfer the IF signal to the third RFIC 226. The third RFIC 226 may convert the IF signal into a 5G Above6 RF signal. Upon reception, the 5G Above6 RF signal may be received from the second network 294 (e.g., 5G network) through an antenna (e.g., antenna 248), and may converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as a single chip or at least part of a single package. According to an embodiment, the first RFFE 232 and the second RFFE 234 may be implemented as a single chip or at least a part of a single package. According to an embodiment, at least one antenna module of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form the third antenna module 246. For example, the wireless communication module 192 or the processor 120 may be disposed on the first substrate (e.g., main PCB). In this case, the third RFIC 226 may be disposed in some areas (e.g., the lower surface) of the second substrate (e.g., sub PCB) separate from the first substrate, and the antenna 248 may be disposed in other areas (e.g., the upper surface), so that the third antenna module 246 may be formed. By arranging the third RFIC 226 and the antenna 248 in the same substrate, it is possible to reduce the length of the transmission line therebetween. This can reduce, for example, loss (e.g., attenuation) of a signal in a high frequency band (e.g., about 6 GHz to about 60 GHz) used for 5G network communication by a transmission line. Accordingly, the electronic device 101 can improve the quality or speed of communication with the second network 294 (e.g., 5G network).

According to an embodiment, the antenna 248 may be formed of an antenna array including a plurality of antenna elements that can be used for beamforming. In this case, the third RFIC 226 may include a plurality of phase shifters 238 corresponding to a plurality of antenna elements, for example, as a part of the third RFFE 236. When transmitting, each of the plurality of phase shifters 238 may convert the phase of the 5G Above6 RF signal to be transmitted to the outside of the electronic device 101 (e.g., a base station of a 5G network) through a corresponding antenna element. Upon reception, each of the plurality of phase shifters 238 may convert the phase of the 5G Above6 RF signal received from the outside to the same or substantially the same phase through a corresponding antenna element. This enables transmission or reception via beamforming between the electronic device 101 and the outside.

The second network 294 (e.g., 5G network) may be operated independently of the first network 292 (e.g., legacy network) (e.g., stand-alone (SA)), or may be connected and operated (e.g.,: non-stand-alone (NSA)). For example, a 5G network may have only an access network (e.g., 5G radio access network (RAN) or next generation RAN (NG RAN)), and no core network (e.g., next generation core (NGC)). In this case, the electronic device 101 may access the access network of the 5G network, and then access the external network (e.g., the Internet) under the control of the core network (e.g., evolved packed core (EPC)) of the legacy network. Protocol information (e.g., LTE protocol information) for communication with a legacy network or protocol information (e.g., new radio (NR) protocol information) for communication with a 5G network may be stored in the memory 230 to be accessed by other components (e.g., the processor 120, the first communication processor 212, or the second communication processor 214).

Figure 3:
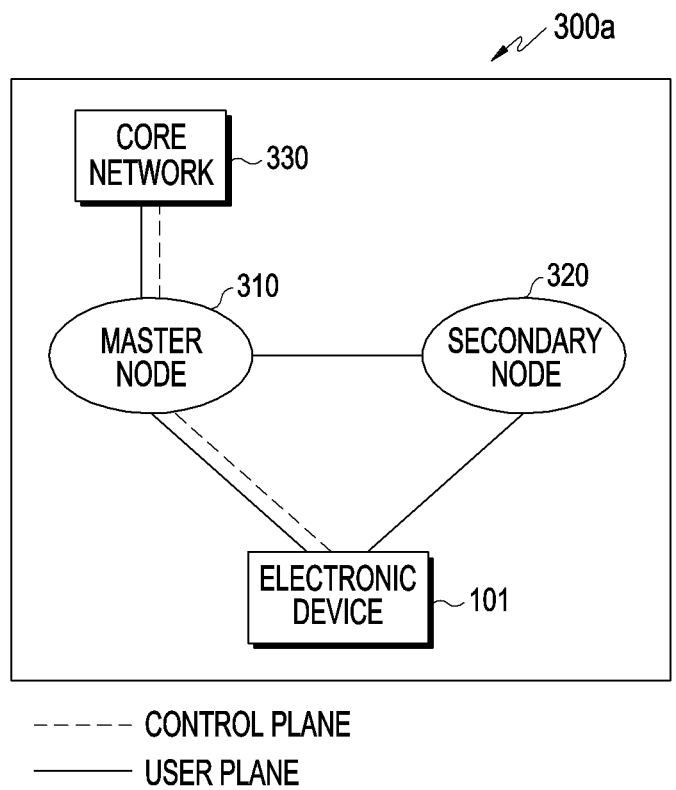
FIG. 3 is a diagram illustrating an example wireless communication system providing a network of legacy communication and/or 5G communication according to various embodiments.

FIG. 3 is a diagram illustrating an example wireless communication system providing a network of legacy communication and/or 5G communication according to various embodiments. Referring to FIG. 3, the network environment 300a may include at least one of a legacy network or a 5G network. The legacy network may include, for example, a 3GPP standard 4G or LTE base station 340 (e.g., an eNB (eNodeB)) supporting wireless connection with an electronic device 101 and an evolved packet core (EPC) managing 4G communication. The 5G network may include, for example, a new radio (NR) base station (e.g., gNB (gNodeB)) supporting wireless connection with the electronic device 101 and a 5th generation core (5GC) managing 5G communication of the electronic device 101.

According to various embodiment, the electronic device 101 may transmit and receive control message and user data through legacy communication and/or 5G communication. The control message may include, for example, a message related to at least one of security control, bearer configuration (bearer setup), authentication, registration, or mobility management. The user data may refer, for example, to user data excluding control messages transmitted and received between the electronic device 101 and the core network 330 (e.g., EPC).

Referring to FIG. 3, the electronic device 101 according to an embodiment may transmit and receive at least one of a control message or user data with at least a part of a 5G network (e.g., NR base station, 5GC) using at least a part of legacy network (e.g., LTE base station, EPC).

According to various embodiments, the network environment 300a may provide a dual connectivity (DC) for wireless communication to an LTE base station and an NR base station, and may include a network environment for transmitting and receiving control messages to and from the electronic device 101 through one core network 230 of the EPC or 5GC.

According to various embodiments, in a DC environment, one of the LTE base station or the NR base station may operate as a master node (MN) 310 and the other as a secondary node (SN) 320. The MN 310 may be connected to the core network 230 to transmit and receive control messages. The MN 310 and the SN 320 may be connected via a network interface to transmit and receive messages related to radio resource (e.g., communication channel) management.

According to various embodiments, the MN 310 may include an LTE base station 340, an SN 320 as an NR base station, and a core network 330 as an EPC. For example, a control message may be transmitted and received through an LTE base station and an EPC, and user data may be transmitted and received through at least one of an LTE base station or an NR base station.

According to various embodiments, the MN 310 may include an NR base station, the SN 320 may include an LTE base station, and the core network 330 may include 5GC. For example, a control message may be transmitted and received through an NR base station and 5GC, and user data may be transmitted and received through at least one of an LTE base station or an NR base station.

According to various embodiments, the electronic device 101 may be registered with at least one of EPC or 5GC to transmit and receive control messages.

According to various embodiments, the EPC or 5GC may manage communication of the electronic device 101 by interworking. For example, movement information of the electronic device 101 may be transmitted and received via an interface between the EPC and 5GC.

As described above, dual connectivity through the LTE base station and the NR base station may be referred to as E-UTRA new radio dual connectivity (EN-DC). Meanwhile, MR DC may be variously applied in addition to EN-DC. For example, a first network and a second network by MR DC are all related to LTE communication, and the second network may be a network corresponding to a small-cell of a specific frequency. For example, the first network and the second network by MR DC are all related to 5G, the first network may correspond to a frequency band below 6 GHz (e.g., below 6), and the second network may correspond to a frequency band above 6 GHz (e.g., over 6). In addition to the above-described examples, those skilled in the art will readily understand that dual connectivity can be applied to various embodiments as long as the applicable network structure is applicable.

Figure 4A:
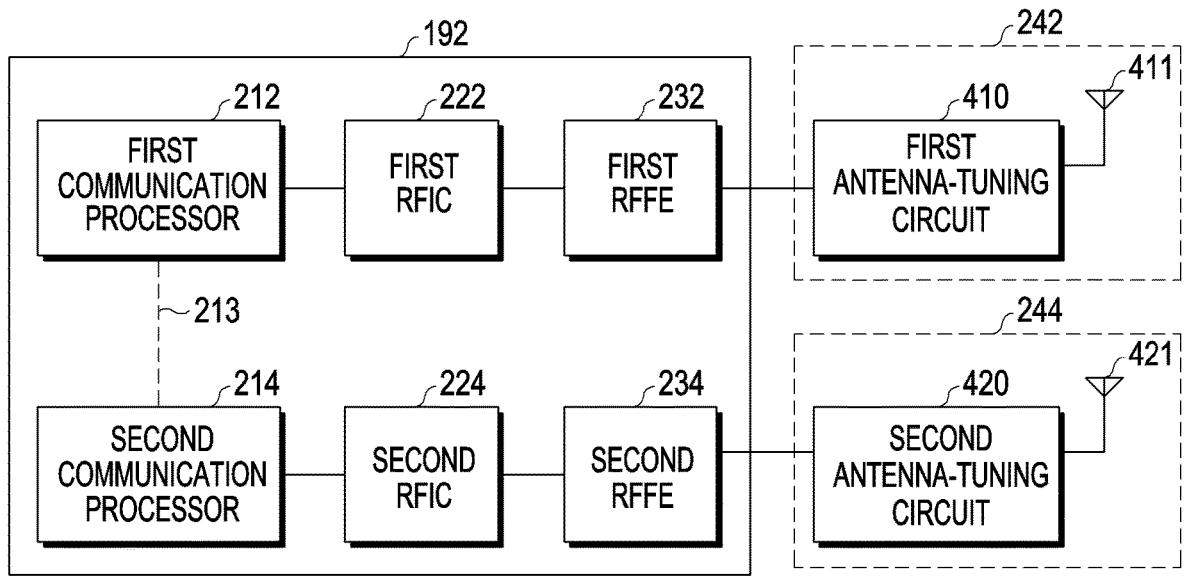
FIG. 4A is a block diagram illustrating an example antenna tuning circuit according to various embodiments.
Figure 4B:
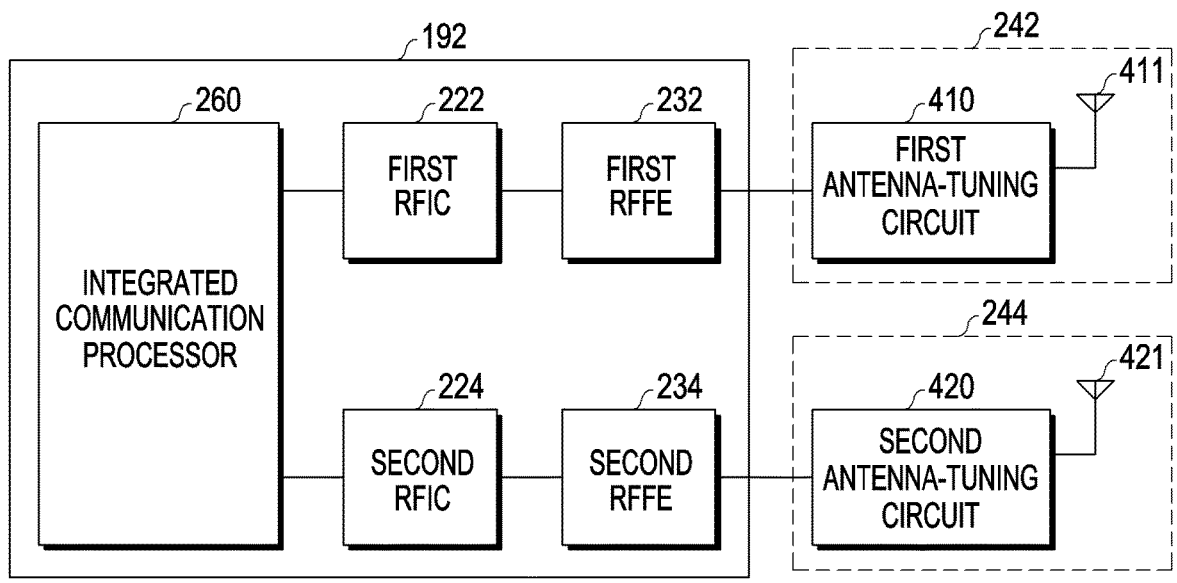
FIG. 4B is a block diagram illustrating an example antenna tuning circuit according to various embodiments.
Figure 4C:
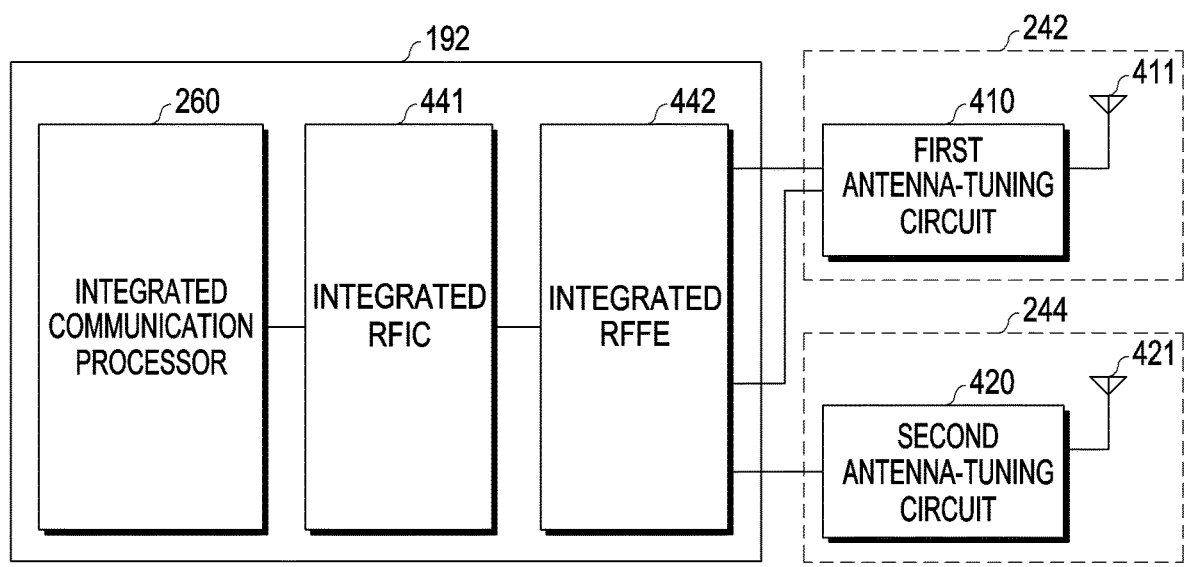
FIG. 4C is a block diagram illustrating an example antenna tuning circuit according to various embodiments.

FIG. 4A is a block diagram illustrating an example antenna tuning circuit according to various embodiments. FIG. 4B is a block diagram illustrating an example antenna tuning circuit according to various embodiments. FIG. 4C is a block diagram illustrating an example antenna tuning circuit according to various embodiments.

Referring to FIG. 4A, according to various embodiments, a wireless communication module 192 may include at least one a first communication processor 212, a second communication processor 214, a first RFIC 222, a second RFIC 224, a first RFFE 232, or a second RFFE 234. In FIG. 4A, it is illustrated as including only some of the components of the wireless communication module 192 of the embodiment of FIG. 2A, but this is for convenience of explanation. According to various embodiments, the wireless communication module 192 of FIG. 4A may be implemented to include substantially the same components as the wireless communication module 192 of FIG. 2A, or may include the components shown in FIG. 4A. The first communication processor 212 and the second communication processor 214 may be connected via an inter-processor interface 213, and may transmit and receive information. According to various embodiments, a first antenna tuning circuit 410 may be connected to the first RFFE 232, and a second antenna tuning circuit 420 may be connected to the second RFFE 234. In various embodiments, the first antenna tuning circuit 410 and the second antenna tuning circuit 420 may be separate from the first RFFE 232 and the second RFFE 234, respectively, or may be implemented as a part of the first RFFE 232 and the second RFFE 234. At least one first antenna 411 may be connected to the first antenna tuning circuit 410, and at least one second antenna 421 may be connected to the second antenna tuning circuit 420. The first antenna tuning circuit 410 may include at least one aperture tuning circuit and/or at least one impedance tuning circuit, and the second antenna tuning circuit 420 may include at least one aperture tuning circuit and/or at least one impedance tuning circuit. The antenna configuration of the first antenna tuning circuit 410 may include the configuration of each of the at least one aperture tuning circuit and/or the configuration of each of the at least one impedance tuning circuit. The antenna configuration of the second antenna tuning circuit 420 may include the configuration of each of the at least one aperture tuning circuit and/or the configuration of each of the at least one impedance tuning circuit.

According to various embodiments, the second RFFE 234 may be connected to the first antenna 411 through the first antenna tuning circuit 410. The first communication processor 212 may transmit a first baseband signal based on the first network communication to the first RFIC 222. The first RFIC 222 may convert the first baseband signal to a first RF signal, based on the first band of the first network communication and transmit the converted signal to the first RFFE 232. The first RFFE 232 may amplify and transmit the first RF signal to the first antenna 411, and the first antenna 411 may emit the first communication signal based on the amplified first RF signal. The second communication processor 214 may transmit a second baseband signal based on the second network communication to the second RFIC 224. The second RFIC 224 may convert the second baseband signal to a second RF signal, based on the second band of the second network communication and transmit the converted signal to the second RFFE 234. The second RFFE 234 may amplify and transmit the second RF signal to the first antenna 411, and the first antenna 411 may emit the second communication signal based on the amplified second RF signal. As described above, the first network communication and the second network communication may share the first antenna 411, and may be referred to as a shared antenna in various embodiments of the disclosure. The shared antenna may be a single antenna or a plurality of antennas.

For example, the first network communication may be implemented as NR communication, and the second network communication may be implemented as NR communication. For example, the first network communication may be implemented as LTE communication, and the second network communication may be implemented as NR communication. According to various embodiments, the electronic device 101 may configure the first network communication to use the LTE-B2 band and the second network communication to use the NR-N71 band. The NR-N71 band is a duplex mode of FDD, and may include a frequency of 600 MHz. The LTE-B2 band is a duplex mode of FDD, and may include a frequency of 1900 MHz. The first network communication and the second network communication may share an antenna in the above-described band (e.g., B2 band/N71 band). During NR communication, a relatively low frequency band such as an N71 band may use an antenna provided for LTE communication. The electronic device 101 may be generally implemented as a portable device such as a smart phone or tablet, and thus it may be difficult to secure an antenna mounting area. For example, an antenna for supporting 600 MHz of the N71 band requires a length of 12.5 cm of λ (wavelength)/4 even when implemented as a mono-pole type, so that the antenna mounting area may be wasted. Accordingly, the electronic device 101 can transmit and receive a communication signal based on the N71 band through the first antenna 411 provided for LTE communication, so that an additional antenna for NR communication may not be mounted on the electronic device 101.

According to various embodiments, the second RFFE 234 may also be connected to the second antenna 421 through the second antenna tuning circuit 420. When a band of the second network communication corresponding to the second antenna 421 is used, the electronic device 101 may control the RF signal from the second RFFE 234 to be transmitted to the second antenna tuning circuit 420. Although not illustrated, a switch capable of selectively connecting the second RFFE 234 and the first antenna tuning circuit 410 and switch capable of selectively connecting the second RFFE 234 and the second antenna tuning circuit 420 may be connected to the second RFFE 234, and the electronic device 101 may control the RF signal from the second RFFE 234 to be transmitted to either the first antenna 411 or the second antenna 421 by controlling the switches. The mode in which the first network communication and the second network communication transmit at least one communication signal through the shared antenna may be referred to as a 2TX-1 antenna mode, and the mode in which each of the first network communication and the second network communication transmits at least one communication signal through each corresponding antenna may be referred to as a 2TX-2 antenna mode.

According to various embodiments, the antenna configuration of the first antenna tuning circuit 410 may affect both the first RF signal and the second RF signal. If the antenna configuration of the first antenna tuning circuit 410 is advantageously configured for the first RF signal, there is a possibility that it is applied to the second RF signal adversely. Here, being advantageous to the first RF signal may refer, for example, to antenna efficiency (radiation efficiency) by the antenna of the first RF signal being relatively high, and being disadvantageous to the second RF signal may refer, for example, to the antenna efficiency being relatively low. When the antenna efficiency is relatively high, the power consumption may be relatively low. Accordingly, the electronic device 101 needs to determine the antenna configuration in consideration of both the first network communication and the second network communication. In an embodiment, the electronic device 101 may determine the antenna configuration of the first antenna tuning circuit 410 such that power consumption by both network communications is minimized. In another embodiment, the electronic device 101 may determine the antenna configuration of the first antenna tuning circuit 410 such that the sum of the data throughputs of both networks is the maximum. A detailed method of antenna configuration according to various embodiments will be described later.

In various embodiments, at least one communication processor (e.g., first communication processor 212 and/or second communication processor 214) may determine antenna configuration of the first antenna tuning circuit 410 and/or the second antenna tuning circuit 420, and apply the determined configuration to the antenna tuning circuit. Here, the control of the antenna tuning circuit may include the on/off state control of the switches included in the antenna tuning circuit, and/or the change of the device values (e.g., capacitance) of variable elements (e.g., variable capacitor) included in the antenna tuning circuit, but those skilled in the art will understand that there is no limit to the control to change the resonance characteristics of the antenna. The on/off of the switches and/or the variable elements will be described later with reference to FIGS. 5B and 5C. In various embodiments, the antenna tuning circuit may be implemented to be included in the RFFE, and the antenna configuration determination and antenna configuration control of the antenna tuning circuit may be controlled by the computing device in the RFFE, not by an external computing device (e.g., a communication processor). In various embodiments, the antenna tuning circuit may be implemented to be included in a communication processor or an RFIC.

Referring to FIG. 4B, the electronic device 101 according to various embodiments may include an integrated communication processor 260. Antenna tuning circuits 410 and 420 may be connected to antennas 411 and 421 corresponding to a plurality of network communications supported by unified communication. The integrated communication processor 260 may transmit a first baseband signal based on the first network communication to the first RFIC 222, and a second baseband signal based on the second network communication to the second RFIC 224. Descriptions of the first RFIC 222, the second RFIC 224, the first RFFE 232, and the second RFFE 234 may be substantially the same as in FIG. 4A. The second RFFE 234 may be connected to the first antenna 411 through the first antenna tuning circuit 410, and may be connected to the second antenna 421 through the second antenna tuning circuit 420. The antenna configuration determination of the antenna tuning circuits 410 and 420 of FIG. 4B may be substantially the same as described with reference to FIG. 4A.

Referring to FIG. 4C, the electronic device 101 according to various embodiments may include an integrated communication processor 260. The integrated communication processor 260 may be connected to an integrated RFIC 441 and the integrated RFIC 441 may be connected to an integrated RFFE 442. The integrated communication processor 260 may transmit a first baseband signal based on the first network communication and a second baseband signal based on the second network communication to the integrated RFIC 441. The integrated RFIC 441 may convert the received baseband signal into an RF signal, based on the configured band of the first network communication or the second network communication. The integrated RFIC 441 may transfer the converted RF signal to the integrated RFFE 442. The integrated RFFE 442 may amplify the received RF signal and transmit the same to either the first antenna 411 or the second antenna 421. According to various embodiments, the integrated RFFE 442 may transmit the amplified RF signal to the first antenna 411 when the received RF signal is based on the first network communication. According to various embodiments, when the received RF signal is based on the second network communication, the integrated RFFE 442 may transmit the amplified RF signal to the first antenna 411 when the configured second network band is the first at least one band, and may transmit the amplified RF signal to the second antenna 421 when the configured second network band is the second at least one band. According to various embodiments, when the received RF signal includes a signal based on the first network communication and a signal based on the second network communication, and each signal overlaps at least partially in time, the integrated RFFE 442 may transmit the amplified RF signal to the first antenna 411. According to various embodiments, the integrated RFFE 442 may receive configurations from the integrated communication processor 260 to generate the received RF signal so as to overlap at least partially the signal based on the first network communication and the signal based on the second network communication. In this case, the integrated RFFE 442 may transmit the amplified RF signal to the first antenna 411.

Figure 5A:
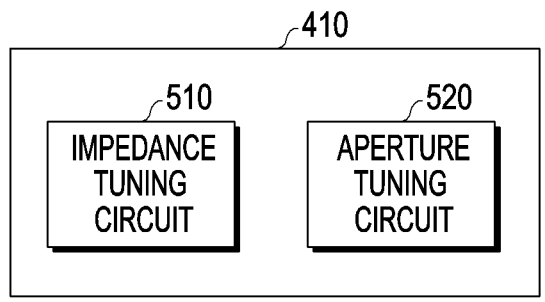
FIG. 5A is a block diagram illustrating an antenna tuning circuit according to various embodiments.
Figure 5B:
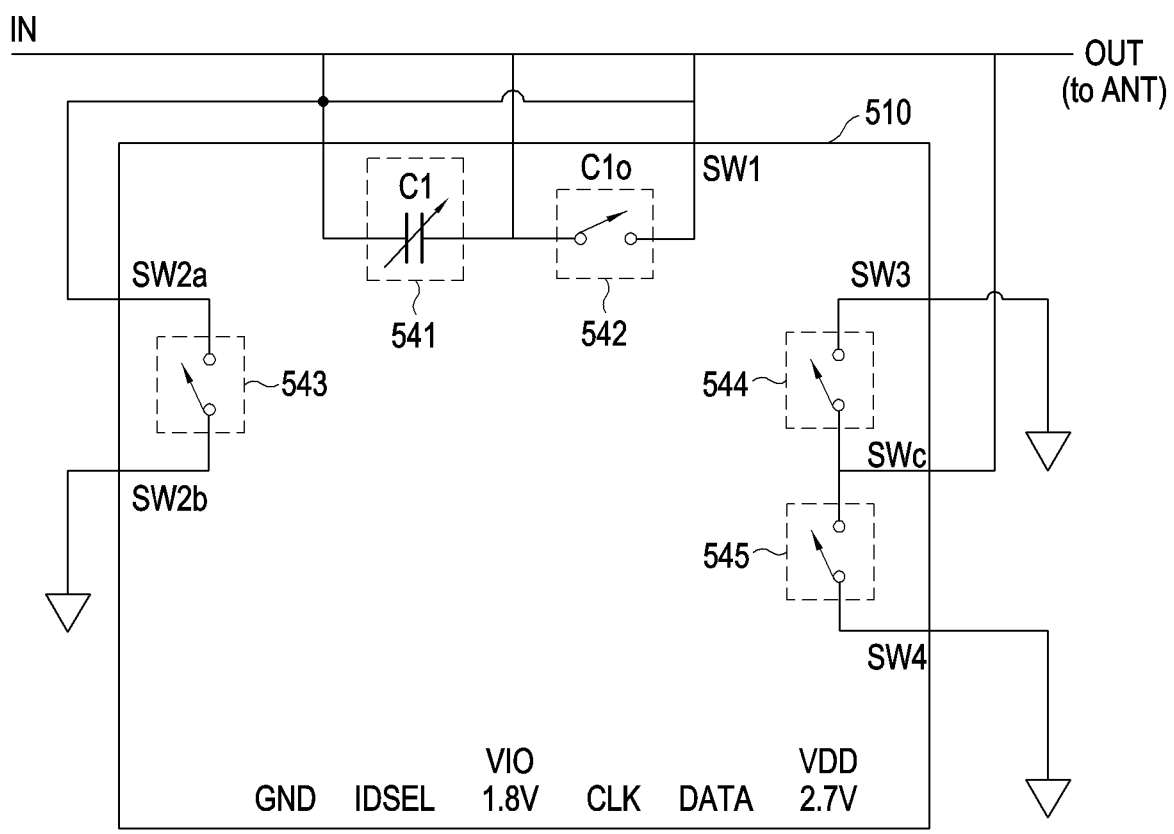
FIG. 5B is a circuit diagram illustrating an example antenna tuning circuit according to various embodiments.
Figure 5C:
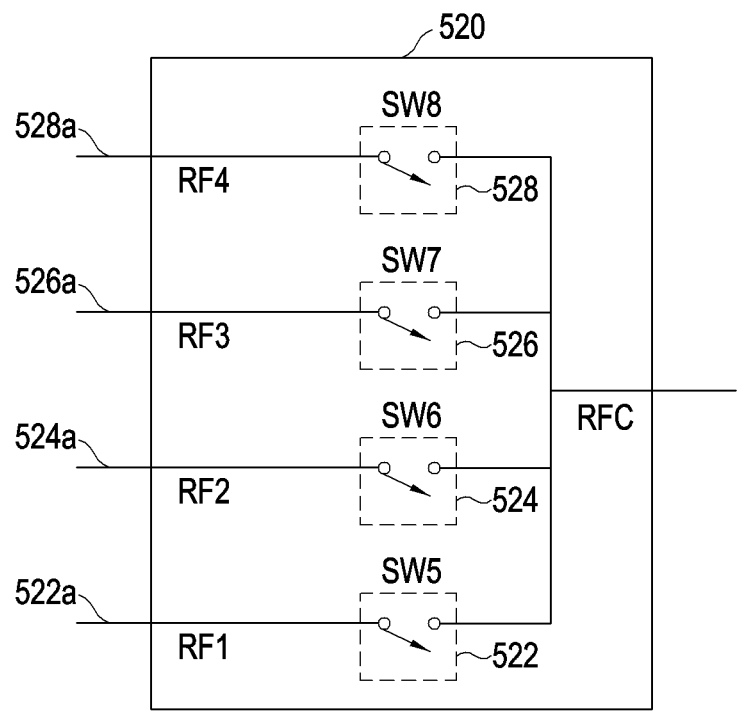
FIG. 5C is a circuit diagram illustrating an example antenna tuning circuit according to various embodiments.
Figure 5D:
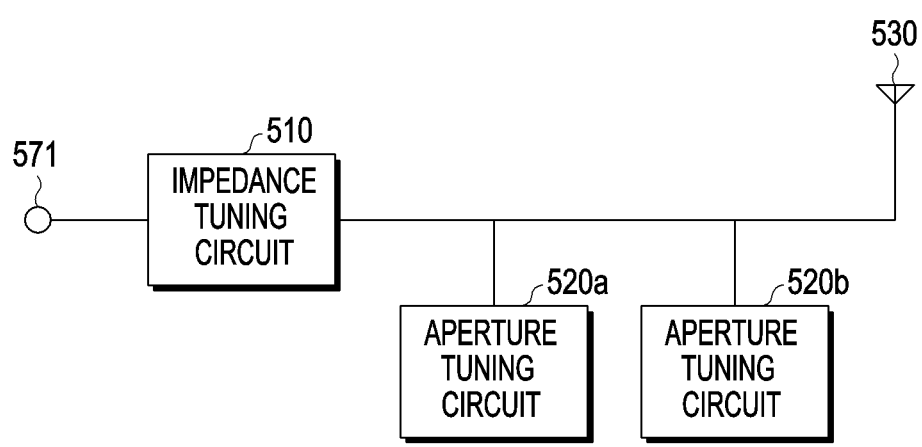
FIG. 5D is a block diagram illustrating an example antenna tuning circuit according to various embodiments.

FIG. 5A is a block diagram illustrating an example antenna tuning circuit according to various embodiments. FIG. 5B is a circuit diagram illustrating an example antenna tuning circuit according to various embodiments. FIG. 5C is a circuit diagram illustrating an example antenna tuning circuit according to various embodiments. FIG. 5D is a block diagram illustrating an example antenna tuning circuit according to various embodiments.

Referring to FIG. 5A, a first antenna tuning circuit 410 according to various embodiments may include at least one impedance tuning circuit 510 and at least one aperture tuning circuit 520. The second antenna tuning circuit 420 may be implemented in the same or similar manner as the first antenna tuning circuit 410, but may be implemented differently. The impedance tuning circuit 510 according to various embodiments may be configured to perform impedance matching with a network under the control of at least one processor (e.g., processor 120, communication processor 212, 214, and/or integrated communication processor 260). The aperture tuning circuit 520 according to various embodiments may change the structure of the antenna by turning on/off the switch according to the control of at least one processor. In FIG. 5B, an exemplary circuit diagram for describing the impedance tuning circuit 510 is shown. In FIG. 5C, an example circuit diagram for explaining the aperture tuning circuit 520 is shown.

Referring to FIG. 5B, the impedance tuning circuit according to various embodiments may include at least one variable capacitor 541, a first switch 542, a second switch 543, a third switch 544 and a fourth switch 545. According to various embodiments, the numbers of the variable capacitor 541, the first switch 542, the second switch 543, the third switch 544, and the fourth switch 545 may be changed. According to various embodiments, at least one variable capacitor 541, the first switch 542, the second switch 543, the third switch 544, and the fourth switch 545 may be implemented on a single chip. The variable capacitor 541 according to various embodiments may have, for example, 16 values (e.g., capacitance value). According to various embodiments, the number of capacitance values of the variable capacitor 541 may be changed. In this case, the impedance tuning circuit 510 according to various embodiments may have a total of 256 types of configurable values (16 (possible values that a variable capacitor can have)×16 (number of cases that are possible with a combination of 4 switches)) (e.g., impedance value). The variable capacitor 541 according to various embodiments may be electrically connected to the first switch 542. One end of each of the second switch 543, the third switch 544, and the fourth switch 545 according to various embodiments may be grounded.

Referring to FIG. 5C, the aperture tuning circuit 520 according to various embodiments may include a fifth switch 522, a sixth switch 524, a seventh switch 526 and an eighth switch 528. According to various embodiments, the fifth switch 522 may be connected to a first terminal (RF1) 522a. According to various embodiments, the sixth switch 524 may be connected to a second terminal (RF2) 524a. According to various embodiments, the seventh switch 526 may be connected to a third terminal (RF3) 526a. According to various embodiments, the eighth switch 528 may be connected to a fourth terminal (RF4) 528a. According to various embodiments, the aperture tuning circuit 520 may have a total of 16 types of cases according to the on/off combinations of switches (e.g., the fifth switch 522, the sixth switch 524, the seventh switch 526, and the eighth switch 528). Accordingly, the tuning circuit 250 according to various embodiments may have a total of 4096 antenna configurations (i.e., 256×16).

As illustrated in FIGS. 5B and 5C, according to a change in the on/off state of a switch included in the antenna tuning circuit (e.g., the impedance tuning circuit 510 and/or the aperture tuning circuit 520), the resonance characteristics (e.g., the resonance frequency of the antenna) of the connected antenna may be changed. The combination of the on/off state of the switch may be referred to as an antenna configuration, and an antenna resonance characteristic may be changed or an antenna efficiency of the antenna may be changed according to the antenna configuration.

According to various embodiments, as shown in FIG. 5D, the impedance tuning circuit 510 may be connected to a conduction point 571. The conduction point 571 may be connected to an RFFE, for example, and may be connected to a duplexer of the RFFE. The conduction point 571 may refer, for example, to a power rail (or power lane) to which the RFFE and antenna tuning circuit are connected. The impedance tuning circuit 510 may be connected to the antenna 530, and the aperture tuning circuits 520a and 520b may be connected to the power rail connecting the impedance tuning circuit 510 and the antenna 530.

Figure 6:
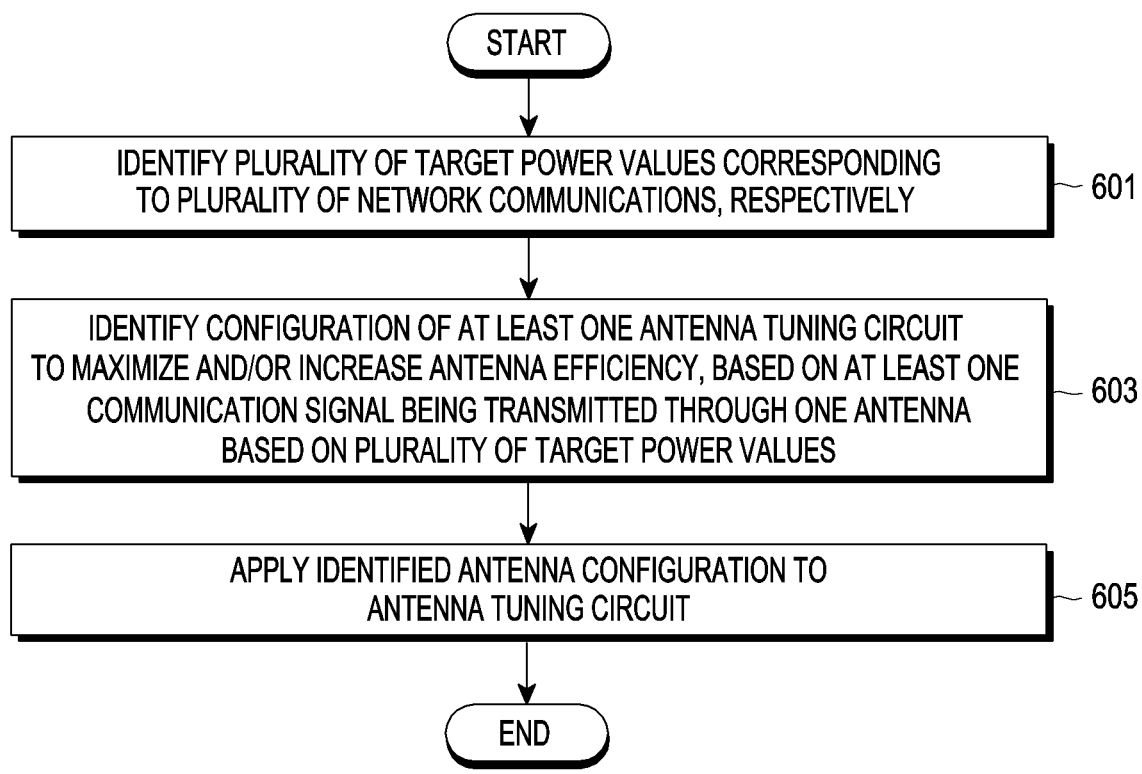
FIG. 6 is a flowchart illustrating an example operation method of an electronic device according to various embodiments.

FIG. 6 is a flowchart illustrating an example operation method of an electronic device according to various embodiments.

According to various embodiments, the electronic device 101 (e.g., at least one of the processor 120, the first communication processor 212, the second communication processor 214, or the integrated communication processor 260) may identify a plurality of target power values respectively corresponding to a plurality of network communications, in operation 601. The target power may be, for example, power requested by a base station to perform data transmission by a terminal to the base station. According to various embodiments, it may be understood as the size of power input to the antenna from the conduction point 571 to match the requested power, and may be expressed in units of dBm or W, but the unit is not limited. In addition, the magnitude of the power applied at any one or more points other than the conduction point 571 (e.g., impedance tuning circuit, aperture tuning circuit, and/or antenna) may also be understood as target power. For example, the electronic device 101 may identify the target power value from the network, but there is no limitation in the method of identifying the target power value. The electronic device 101 may identify the target power value by itself via the open power control. According to various embodiments, a target power reference may be one of values configured by a base station for a PUCCH or a PUSCH. According to various embodiments, a larger value among values configured by a base station for PUCCH or PUSCH may be used. The electronic device 101 may identify a first target power value corresponding to the first network communication (e.g., LTE communication) and a second target power value corresponding to the second network communication (e.g., NR communication). It may be different from the first target power value and the second target power. According to various embodiments, the electronic device 101 may identify a first target power value corresponding to the first network communication (e.g., LTE communication), and then identify the second target power value corresponding to the second network communication (e.g., NR communication), based on the identified first target power value. According to various embodiments, the electronic device 101 may identify a second target power value corresponding to the second network communication (e.g., NR communication), and then identify a first target power value corresponding to the first network communication (e.g., LTE communication), based on the checked second target power value.

According to various embodiments, when at least one communication signal is transmitted through one antenna (e.g., the first antenna 411), based on a plurality of target power values, the electronic device 101 may identify the antenna configuration of at least one antenna tuning circuit to maximize and/or increase the antenna efficiency based on at least one communication signal being transmitted through one antenna based on a plurality of target power values, in operation 603. A plurality of antenna configurations applied to the antenna tuning circuit may be stored in the memory of the electronic device 101 (e.g., the memory 130 and/or the dedicated memory of the wireless communication module 192). The dedicated memory of the wireless communication module 192 may be included in, for example, a communication processor, or may be connected to the communication processor. The electronic device 101 may identify an antenna configuration to maximize antenna efficiency among a plurality of antenna configurations. According to various embodiments, the electronic device 101 may identify the antenna configuration of at least one antenna tuning circuit to minimize power consumption. According to various embodiments, the antenna configuration to maximize antenna efficiency may be the same as the antenna configuration of at least one antenna tuning circuit to minimize power consumption. The electronic device 101 may identify, for each of the plurality of antenna configurations, the first power consumption by the first network communication and the second power consumption by the second network communication. The electronic device 101 may identify, for example, the sum of the power consumption estimated based on target power values and information previously stored for each antenna configuration (e.g., an impedance tuning circuit configuration and/or an aperture tuning circuit configuration). The electronic device 101 may identify power consumption for each antenna configuration, for example, based on antenna efficiency and target power value for each antenna configuration. Table 1 illustrates example information on antenna efficiency per antenna configuration according to various embodiments.

TABLE 1

| Antenna Tuner | | Radiation/ Conduction Power | |
|---|---|---|---|
| Impedance tuner | Apertuer tuner | N71 | B2 |
| 1 | a | 0.9 | 0.7 |
|   | b | 0.8 | 0.8 |
|   | c | 0.7 | 0.9 |
|   | d | 0.6 | 0.8 |
| 2 | a | 0.5 | 0.7 |
|   | b | 0.4 | 0.5 |
|   | c | 0.3 | 0.8 |
|   | d | 0.2 | 0.9 |
| 3 | a | 0.1 | 0.7 |
|   | b | 0.5 | 0.5 |
|   | c | 0.6 | 0.4 |
|   | d | 0.7 | 0.3 |
| 4 | a | 0.8 | 0.5 |
|   | b | 0.4 | 0.8 |
|   | c | 0.5 | 0.9 |
|   | d | 0.7 | 0.7 |

As shown in Table 1, the electronic device 101 may store the value of antenna efficiency (radiation/conduction power) for each antenna configuration (combination of the antenna configuration (e.g., 1, 2, 3, 4) of the impedance tuning circuit and the antenna configuration (e.g., a, b, c, d) of the aperture tuning circuit (aperture tuner)). The antenna efficiency may be, for example, a ratio of the amount of power emitted from the first antenna 411 to the power incident from the conduction point (e.g., the conduction point 571) toward the first antenna 411, and may be referred to as a emission efficiency and radiation efficiency, for example. The electronic device 101 may store antenna efficiency for each band (e.g., N71 band and B2 band). In Table 1, the antenna efficiency is expressed as stored for the bands to be identified (e.g., N71 band and B2 band), but this is exemplary. The electronic device 101 may store antenna efficiency for all bands for each antenna configuration.

In various embodiments, the electronic device 101 may identify, for example, a voltage standing wave ratio (VSWR) for each antenna configuration. The electronic device 101 may map and store VSWR for each antenna configuration. The VSWR may be expressed based on a reflection coefficient (e.g., $\Gamma$), which is a ratio of a reflected voltage to a voltage input to the antenna. For example, the VSWR may be expressed as $(1+|\Gamma|)/(1-|\Gamma|)$. The electronic device 101 may identify power consumption for each antenna configuration by using VSWR and target power values for each antenna configuration. The electronic device 101 may estimate power consumption, based on the bandwidth of each of the plurality of network communications. Those skilled in the art will understand that the electronic device 101 is not limited in a manner of predicting power consumption for each antenna configuration. The electronic device 101 may select an antenna configuration corresponding to the minimum power consumption among the identified power consumptions.

According to various embodiments, the electronic device 101 may apply the identified configuration to at least one antenna tuning circuit in operation 605. The electronic device 101 may apply the identified antenna configuration to the antenna tuning circuit, in operation 603. The expression in which the electronic device 101 applies the antenna configuration to the antenna tuning circuit may refer, for example, to controlling the antenna tuning circuit, based on the identified antenna configuration (e.g., the on/off state of a switch included in the antenna tuning circuit, and/or changing the value of a variable element included in the antenna tuning circuit). When the corresponding antenna configuration is applied, the power consumption may be minimized.

Figure 7:
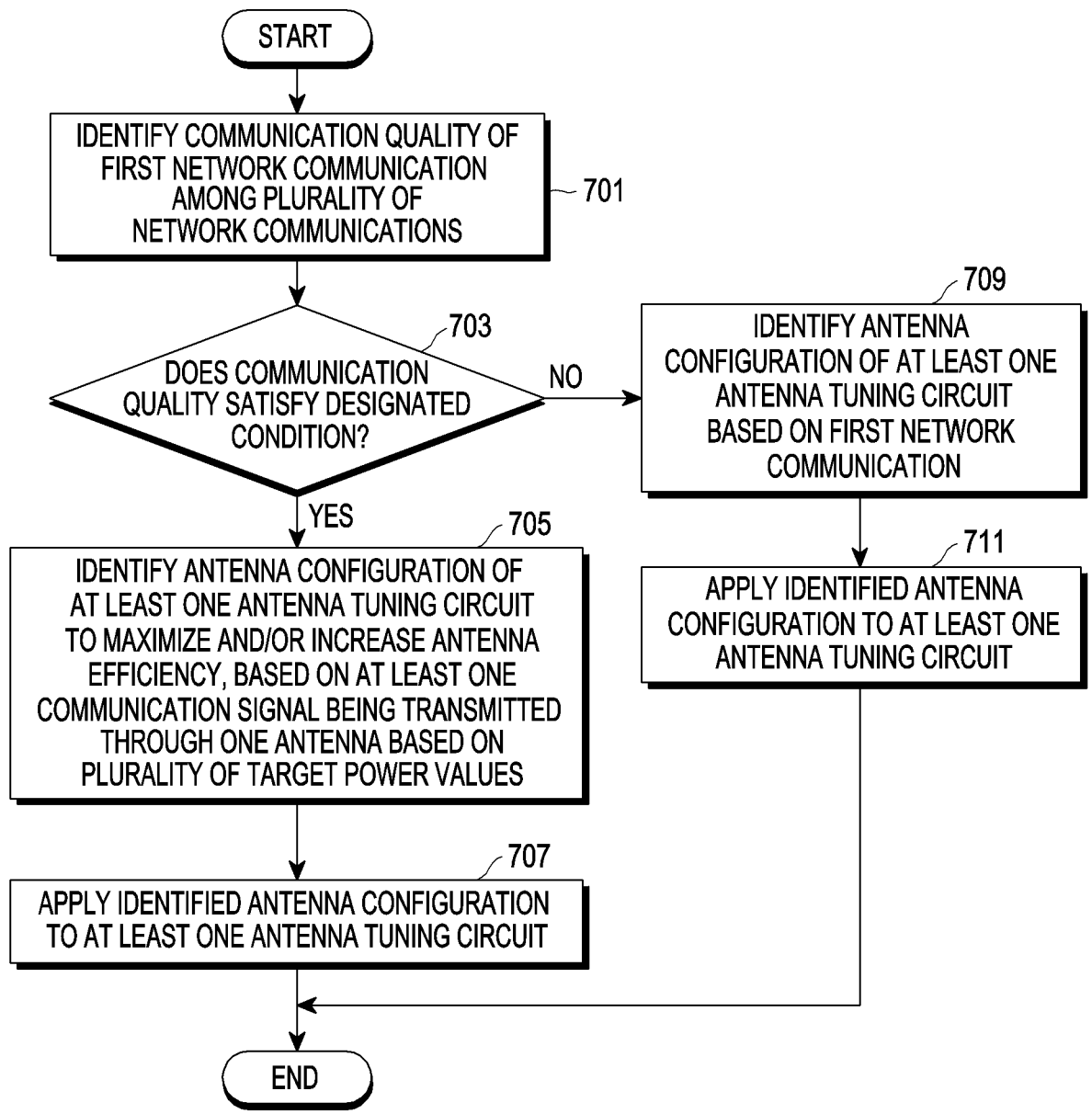
FIG. 7 is a flowchart illustrating an example operation method of an electronic device according to various embodiments.

FIG. 7 is a flowchart illustrating an example operation method of an electronic device according to various embodiments.

According to various embodiments, the electronic device 101 (e.g., at least one of the processor 120, the first communication processor 212, the second communication processor 214, or the integrated communication processor 260) may identify the communication quality of a first network communication among a plurality of network communications, in operation 701. According to various embodiments, the first network communication may be, for example, a network communication performed between the MN 310 and the electronic device 101 in a dual connectivity environment. According to various embodiments, the first network communication may be, for example, a network communication performed between the main carrier 310 and the electronic device 101 in a frequency aggregation (Carrier Aggregation) environment. The first network communication may be a network communication capable of transmitting and receiving at least one of a control message and a data message, for example, LTE communication in ENDC. In operation 703, the electronic device 101 may identify whether the communication quality satisfies the designated condition. The designated condition may be, for example, a condition indicating a good communication quality. For example, when the transmission strength for the first network communication required to satisfy the designated condition increases above a certain threshold (e.g., 20 dBm), the electronic device 101 may identify that the communication quality does not satisfy the designated condition. For example, when the transmission strength of the first network communication is transmitted to the maximum value, the electronic device 101 may identify that the communication quality does not satisfy the designated condition when receiving the NACK indicating failure of UL data transmission. The designated condition is not limited as long as it is a condition indicating that the communication environment of the first network communication is good.

According to various embodiments, when it is determined that the designated condition is satisfied (703—Yes), the electronic device 101 may identify the antenna configuration of at least one antenna tuning circuit to maximize and/or improve the antenna efficiency, when at least one communication signal is transmitted through one antenna in operation 705, based on a plurality of target power values. The electronic device 101 may apply the identified configuration to at least one antenna tuning circuit in operation 707. For example, when indicating that the communication quality of the first network communication is good, the electronic device 101 may select an antenna configuration that maximizes and/or improves antenna efficiency. The antenna configuration to maximize the antenna efficiency may be an antenna configuration to minimize power consumption as described above.

According to various embodiments, if it is determined that the designated condition is not satisfied (703—No), the electronic device 101 may identify the antenna configuration of the at least one antenna tuning circuit, based on the first network communication in operation 709, and apply the identified antenna configuration to at least one antenna tuning circuit in operation 711. For example, the electronic device 101 may select an antenna configuration in which the efficiency of the first antenna in the first network communication has the maximum value. According to various embodiments, the electronic device 101 may ignore the second antenna efficiency of the second network communication and select an antenna configuration having the maximum value of the first antenna efficiency. This is for the stability of the first network communication for the control plane even if the power consumption increases. For example, when the first network communication (e.g., LTE communication) is released in ENDC, not only the first network communication but also the second network communication (e.g., NR communication) may be released. Accordingly, when the communication quality of the first network communication is deteriorated, an antenna configuration for communication stability of the first network communication can be selected rather than minimizing power consumption by both network communication. In another example, when it is determined that the designated condition is satisfied, the electronic device 101 may select one of at least one antenna configuration, based on the headroom of the first network communication. For example, the electronic device 101 may select an antenna configuration in which power consumption by the second network communication is a minimum among at least one antenna configuration included in the headroom.

According to various embodiments, although not illustrated, the electronic device 101 may determine whether to determine an antenna configuration considering both network communication, based on whether a designated service (e.g., a VOLTE service) is running. For example, while the VOLTE service is running, the electronic device 101 may select an antenna configuration in which the first antenna efficiency in the first network communication (e.g., LTE communication) has the maximum value. For example, while the VOLTE service is running, the electronic device 101 may select one of at least one antenna configuration included in the headroom of the first network communication (e.g., LTE communication). For example, the electronic device 101 may select an antenna configuration in which power consumption by the second network communication (e.g., NR communication) is minimal among at least one antenna configuration included in the headroom.

Figure 8:
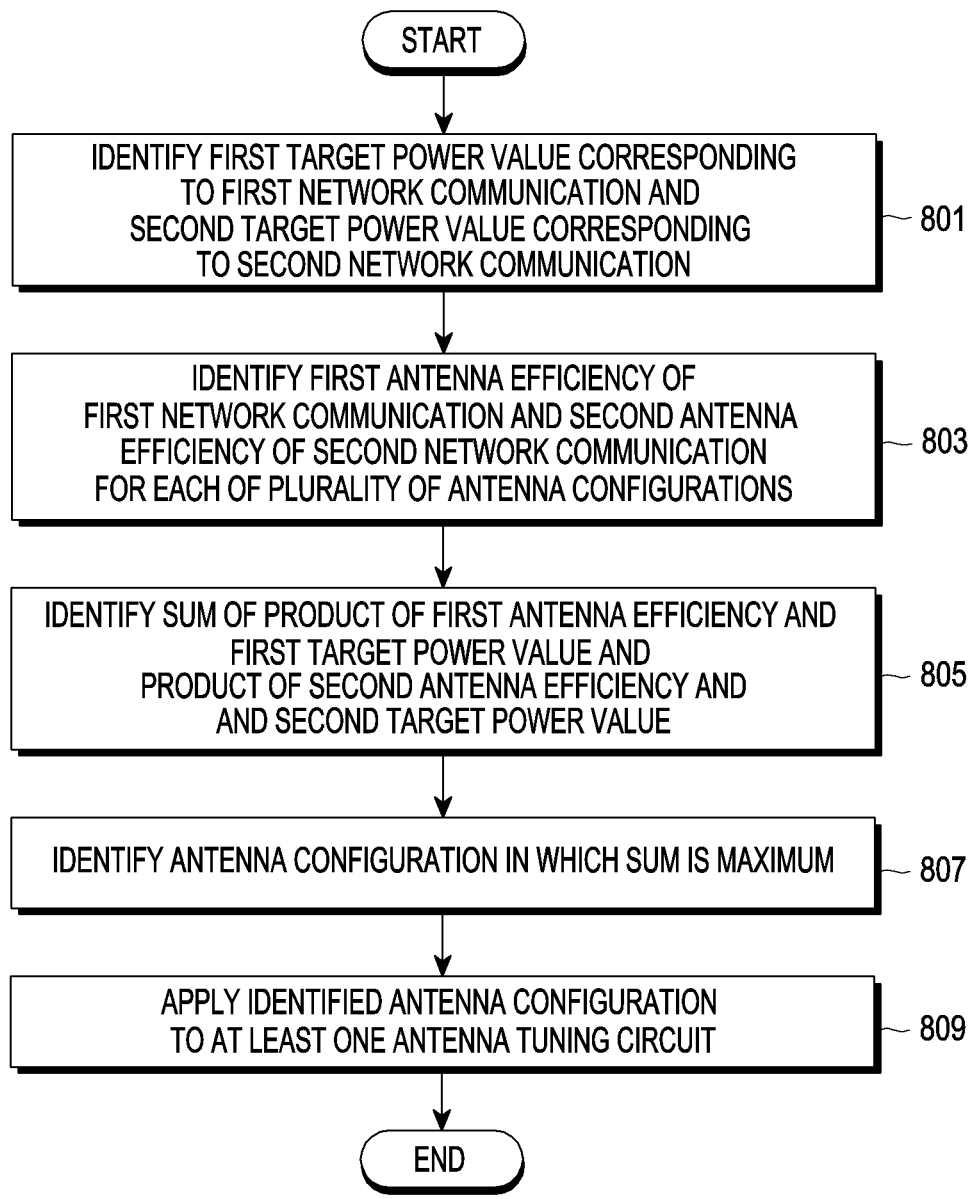
FIG. 8 is a flowchart illustrating an example operation method of an electronic device according to various embodiments.

FIG. 8 is a flowchart illustrating an example operation method of an electronic device according to various embodiments. The embodiment of FIG. 8 will be described with reference to FIG. 9. FIG. 9 is a diagram illustrating antenna efficiency and power consumption for each antenna configuration according to various embodiments.

According to various embodiments, in operation 801, the electronic device 101 (e.g., at least one of the processor 120, the first communication processor 212, the second communication processor 214, or the integrated communication processor 260) may identify a first target power value corresponding to a first network communication and a second target power value corresponding to a second network communication. For example, the electronic device

101 may receive and identify information on target powers from the network, but there is no limitation on the way the electronic device 101 identifies the target power values. For example, the electronic device 101 may identify the first target power value of the first network communication as 0 dBm (1 mW) and the second target power value as 20 dBm (100 mW). According to various embodiments, the electronic device 101 may identify a first target power value corresponding to the first network communication (e.g., LTE communication), and then identify a second target power value corresponding to the second network communication (e.g., NR communication), based on the identified first target power value. According to various embodiments, the electronic device 101 may identify a second target power value corresponding to the second network communication (e.g., NR communication), and then identify a first target power value corresponding to the first network communication (e.g., LTE communication), based on the identified second target power value.

In operation 803, the electronic device 101 may identify a first antenna efficiency for the operating frequency of the first network communication and a second antenna efficiency for the operating frequency of the second network communication for each of a plurality of antenna configuration values. The first network communication and the second network communication may be, for example, dual connectivity of NR communication-NR communication, carrier aggregation (CA) of NR communication-NR communication, dual connectivity of LTE communication-LTE communication, CA of LTE communication-LTE communication, or communication constituting ENDC. For example, the electronic device 101 may identify antenna efficiencies for each antenna configuration value as shown in Table 1. In operation 805, the electronic device 101 may identify the sum of the product of the first antenna efficiency and the first target power value and the product of the second antenna efficiency and the second target power value. In operation 807, the electronic device 101 may identify the antenna configuration having the maximum total. When the product of the first antenna efficiency and the first target power value and the product of the second antenna efficiency and the second target power value are maximized, it may refer, for example, to the antenna efficiency being maximized and power consumption being minimized when data is transmitted via arbitrary quality of service (QoS). According to various embodiments, in the process of calculating the sum of the product of the first antenna efficiency and the first target power value and the product of the second antenna efficiency and the second target power value in operation 805, each parameter may have at least one different weight. For example, the electronic device 101 may calculate by a formula of a*(first antenna efficiency*first target power value)+b*(second antenna efficiency*second target power value) (however, a+b=1, a, b>0).

For example, when the first target power value of the first network communication is identified to be 0 dBm (1 mW), and the second target power value of the second network communication is identified to be 20 dBm (100 mW), the electronic device 101 may identify that the sum 901 corresponding to the first antenna configuration (e.g., impedance tuning circuit configuration: "1", aperture tuning circuit configuration: "a") is 90.7, which is the maximum. In operation 809, the electronic device 101 may apply the identified antenna configuration (e.g., the first antenna configuration) to at least one antenna tuning circuit. Referring to FIG. 9, for example, when the first target power value of the first network communication is identified to be 12 dBm and the second target power value of the second network communication is identified to be 15 dBm, the electronic device 101 may identify that the sum 902 corresponding to the second antenna configuration (e.g., impedance tuning circuit configuration: "1", aperture tuning circuit configuration: "b") is 40.034, which is the maximum. For example, when the first target power value of the first network communication is identified to be 13 dBm and the second target power value of the second network communication is identified to be 10 dBm, the electronic device 101 may identify that the sum 903 corresponding to the second antenna configuration (e.g., impedance tuning circuit configuration: "1", aperture tuning circuit configuration: "b") is 25.061, which is the maximum. For example, when the first target power value of the first network communication is identified to be 20 dBm and the second target power value of the second network communication is identified to be 0 dBm, the electronic device 101 may identify that the sum 904 corresponding to the third antenna configuration (e.g., impedance tuning circuit configuration: "1", aperture tuning circuit configuration: "c") is 90.700, which is the maximum. As described above, even when using the same band (e.g., the B2 band of LTE and the N71 band of NR), antenna configurations may be configured differently for each target power of each network communication.

According to various embodiments, the electronic device 101 may select any one of at least one antenna configuration in which the sum is equal to or greater than the threshold sum, rather than the antenna configuration in which the sum is the maximum. As will be described later, the electronic device 101 may determine an antenna configuration to maximize data throughput. The electronic device 101 may select an antenna configuration having a maximum data throughput among at least one antenna configuration in which the sum is equal to or greater than a threshold sum. When transmitting communication signals of both network communication with the corresponding antenna configuration, high data throughput can be ensured while the power consumption is below the critical power consumption.

Figure 10:
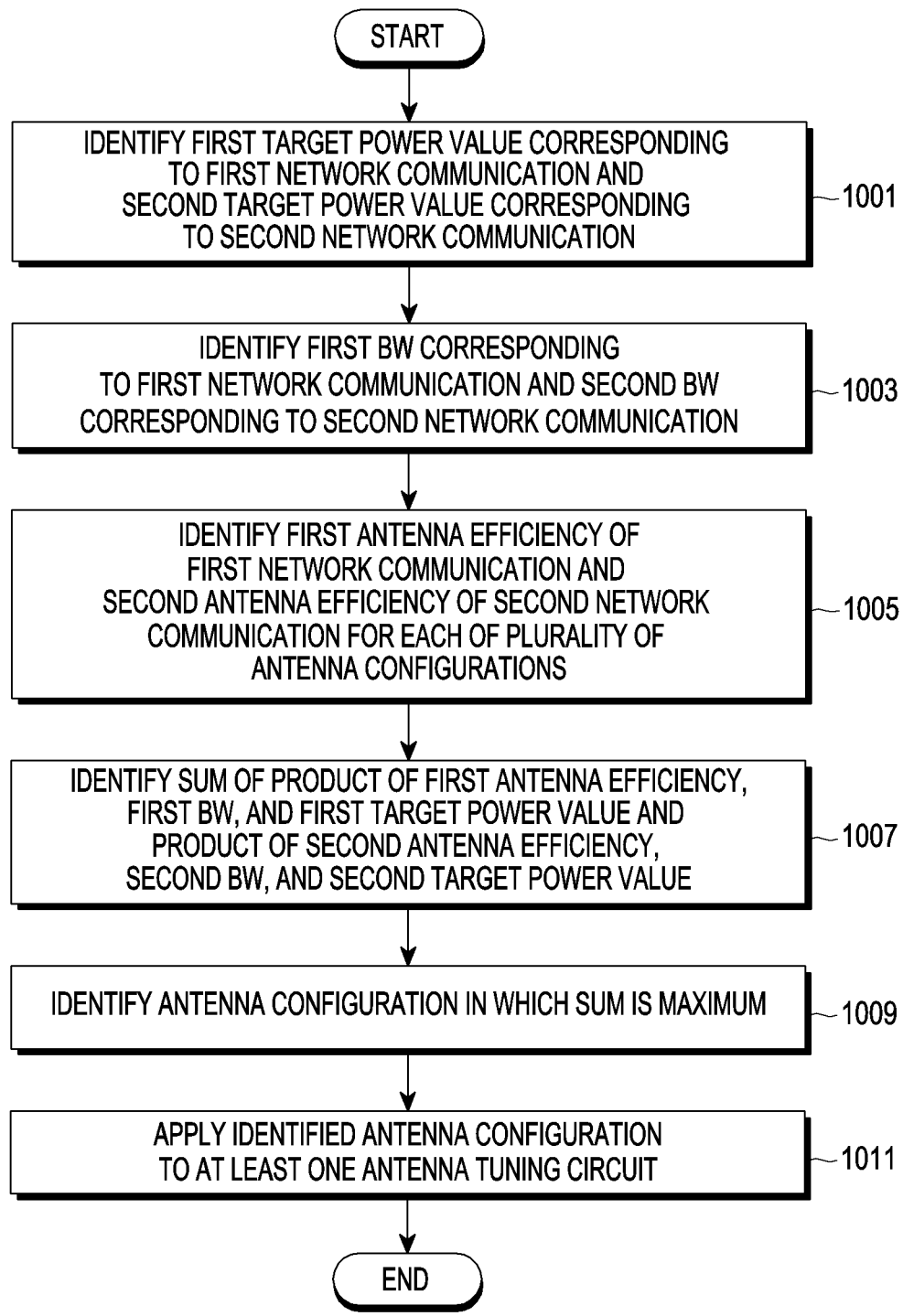
FIG. 10 is a flowchart illustrating an example operation method of an electronic device according to various embodiments.

FIG. 10 is a flowchart illustrating an example operation method of an electronic device according to various embodiments. Among the operations of FIG. 10, description of the operation illustrated in FIG. 8 will be briefly described. FIG. 11 is a table for predicting antenna efficiency and power consumption for each antenna configuration according to various embodiments.

According to various embodiments, in operation 1001, the electronic device 101 (e.g., at least one of the processor 120, the first communication processor 212, the second communication processor 214, or the integrated communication processor 260) may identify a first target power value of a frequency band corresponding to a first network communication and a second target power value of a frequency band corresponding to a second network communication. In operation 1003, the electronic device 101 may identify a first bandwidth (BW) corresponding to the first network communication and a second bandwidth corresponding to the second network communication. For example, the electronic device 101 may identify the first bandwidth of the first network communication band (e.g., B2 band) as 20 MHz and the second bandwidth of the second network communication band (e.g., N71 band) as 5 MHz. The electronic device 101 may store information on bandwidth for each band in advance or receive information from another electronic device to identify. In operation 1005, the electronic device 101 may identify the first antenna efficiency of the first network communication and the second antenna efficiency of the second network communication for each of a plurality of configuration values. For example, the electronic device 101 may identify antenna efficiency as shown in Table 1.

According to various embodiments, in operation 1007, the electronic device 101 may identify the sum of the product of the first antenna efficiency, the first bandwidth and the first target power value and the product of the second antenna efficiency, the second bandwidth and the second target power value. In operation 1009, the electronic device 101 may identify the antenna configuration value of which the sum is the maximum. The first bandwidth and the second bandwidth may be an uplink bandwidth configured in the electronic device 101 via a dedicated RRC signal from a base station. In operation 1011, the electronic device 101 may apply the identified antenna configuration value to at least one antenna tuning circuit.

Referring to FIG. 11, for example, when the first target power value of the first network communication is identified to be 0 dBm (1 mW), and the second target power value of the second network communication is identified to be 20 dBm (100 mW), the first bandwidth of the first network communication is identified to be 5 MHz, and the second bandwidth of the second network communication to be 20 MHz, the electronic device 101 may identify that the sum 1101 corresponding to the first antenna configuration (e.g., impedance tuning circuit configuration: "1", aperture tuning circuit configuration: "a") is 464, which is the maximum. For example, when the first target power value of the first network communication is identified to be 12 dBm, and the second target power value of the second network communication is identified to be 15 dBm, the first bandwidth of the first network communication is identified to be 5 MHz, and the second bandwidth of the second network communication to be 20 MHz, the electronic device 101 may identify that the sum 1102 corresponding to the first antenna configuration (e.g., impedance tuning circuit configuration: "1", aperture tuning circuit configuration: "a") is 397.489, which is the maximum. For example, when the first target power value of the first network communication is identified to be 13 dBm, and the second target power value of the second network communication is identified to be 10 dBm, the first bandwidth of the first network communication is identified to be 5 MHz, and the second bandwidth of the second network communication to be 20 MHz, the electronic device 101 may identify that the sum 1103 corresponding to the third antenna configuration (e.g., impedance tuning circuit configuration: "1", aperture tuning circuit configuration: "c") is 394.147, which is the maximum. For example, when the first target power value of the first network communication is identified to be 20 dBm, and the second target power value of the second network communication is identified to be 0 dBm, the first bandwidth of the first network communication is identified to be 5 MHz, and the second bandwidth of the second network communication to be 20 MHz, the electronic device 101 may identify that the sum 1104 corresponding to the third antenna configuration (e.g., impedance tuning circuit configuration: "1", aperture tuning circuit configuration: "c") is 1803.500, which is the maximum. As described above, even when using the same band (e.g., the B2 band of LTE and the N71 band of NR), antenna configurations may be configured differently for each target power of each network communication. According to various embodiments, in the process of calculating the sum of the product of the first antenna efficiency, the first bandwidth and the first target power value, and the product of the second antenna efficiency, the second bandwidth and the second target power value in operation 1007, each parameter may have at least one different weight. For example, the electronic device 101 may calculate by a formula of a*(first antenna efficiency*first bandwidth*first target power value)+b*(second antenna efficiency*second bandwidth*second target power value) (however, a+b=1, a, b>0).

According to various embodiments, the electronic device 101 may select any one of at least one antenna configuration in which the sum is equal to or greater than a threshold sum, rather than an antenna configuration in which the sum of products of target power, antenna efficiency, and bandwidth is the maximum. As will be described later, the electronic device 101 may determine an antenna configuration to maximize data throughput. The electronic device 101 may select an antenna configuration having a maximum data throughput among at least one antenna configuration in which the sum is equal to or greater than a threshold sum.

Figure 12:
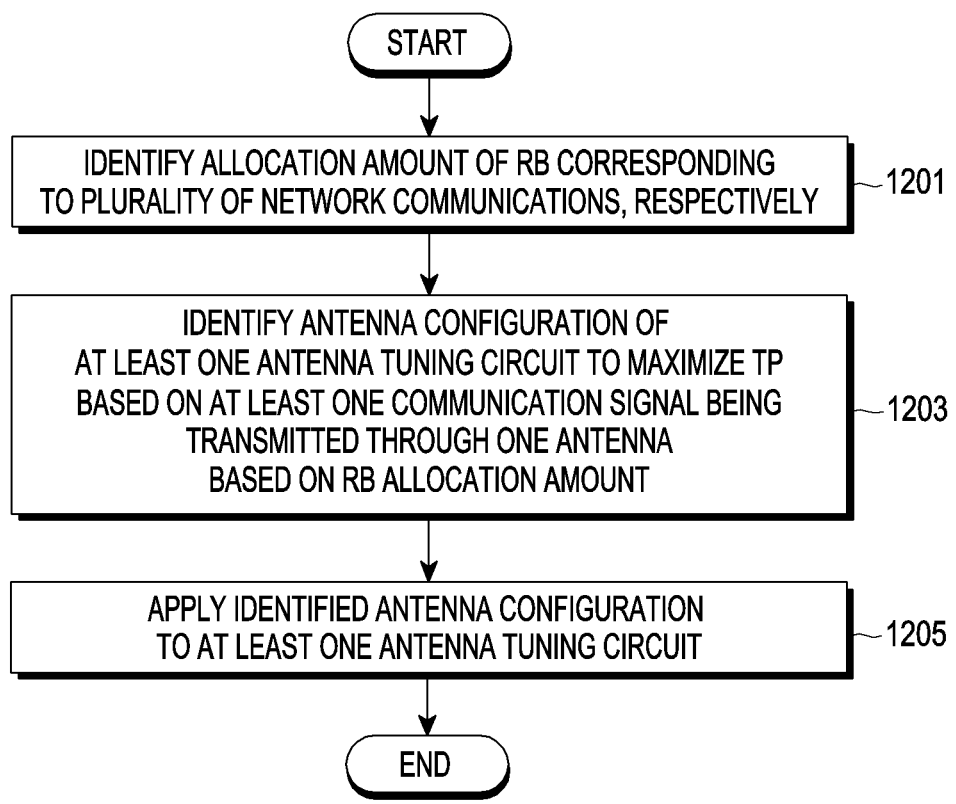
FIG. 12 is a flowchart illustrating an example operation method of an electronic device according to various embodiments.

FIG. 12 is a flowchart illustrating an example operation method of an electronic device according to various embodiments.

According to various embodiments, in operation 1201, the electronic device 101 (e.g., at least one of the processor 120, the first communication processor 212, the second communication processor 214, or the integrated communication processor 260) may identify the allocation amount of the resource block (RB) corresponding to a plurality communications, respectively. For example, the electronic device 101 may identify the allocation amount of the resource block allocated for each network communication during a designated period (N millisecond). For example, the allocation amount of the resource block allocated for each network communication may be the number of radio blocks (RBs) allocated by the electronic device 101 for uplink transmission via the PDCCH from the base station. For example, the designated period (N millisecond) may be determined as an antenna configuration update time (e.g., 200 ms), but is not limited.

According to various embodiments, in operation 1203, when at least one communication signal is transmitted through one antenna, based on the allocation amount of the resource block, the electronic device 101 may identify the configuration value of at least one antenna tuning circuit to maximize the data throughput (TP). The electronic device 101 may select, for example, an antenna configuration suitable for network communication in which data throughput is configured higher. For example, an antenna configuration having a relatively high antenna efficiency of a network communication in which data throughput is configured higher may be selected, but the selection method is not limited. In operation 1205, the electronic device 101 may apply the identified antenna configuration to at least one antenna tuning circuit.

Figure 13A:
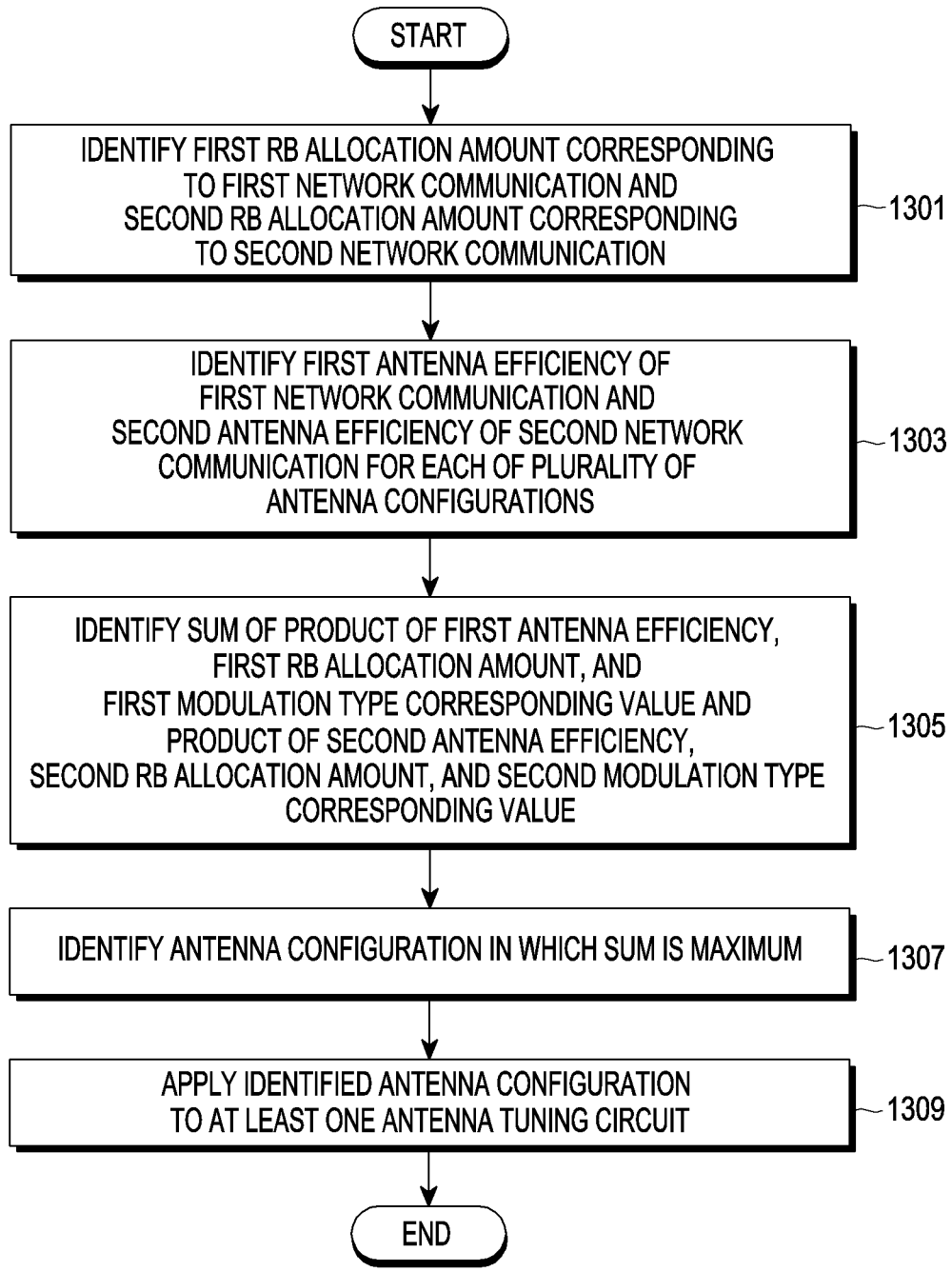
FIG. 13A is a flowchart illustrating an example operation method of an electronic device according to various embodiments.

FIG. 13A is a flowchart illustrating an example operation method of an electronic device according to various embodiments.

According to various embodiments, in operation 1301, the electronic device 101 (e.g., at least one of the processor 120, the first communication processor 212, the second communication processor 214, or the integrated communication processor 260) may identify the allocation amount of a first resource block corresponding to the first network communication and the allocation amount of a second resource block corresponding to the second network communication. For example, the allocation amount of the first resource block and the allocation amount of the second resource block may be the numbers of radio blocks (RBs)

allocated by the electronic device 101 for uplink transmission from the base station via the PDCCH. In operation 1303, the electronic device 101 may identify the first antenna efficiency of the first network communication and the second antenna efficiency of the second network communication for each of a plurality of antenna configurations. For example, the electronic device 101 may identify first antenna efficiency and second antenna efficiency for each antenna configuration, as shown in Table 1.

According to various embodiments, in operation 1305, the electronic device 101 may identify the sum of the product of the first antenna efficiency, the first resource block allocation amount and the first modulation type corresponding value, and the product of the second antenna efficiency, the second resource block allocation amount and the second modulation type corresponding value. The first modulation type corresponding value is a number of bits that can be expressed per symbol for each modulation method (e.g., BPSK, QPSK, 8PSK, 16 QAM, and 256 QAM) used in the first network communication, and may be a modulation index. In operation 1307, the electronic device 101 may identify the antenna configuration in which the sum is the maximum. The electronic device 101 may apply the identified antenna configuration to at least one antenna tuning circuit, in operation 1309. According to various embodiments, in the process of calculating the sum of the product of the first antenna efficiency, the first resource block allocation amount, and the first modulation type corresponding value and the product of the second antenna efficiency, the second resource block allocation amount, and the second modulation type corresponding value in operation 1305, each parameter may have at least one different weight. For example, the electronic device 101 may calculate by the formula of a*(first antenna efficiency*first resource block allocation amount*first modulation type correspondence value)+b*(second antenna efficiency*second resource block allocation amount*second modulation type corresponding value) (however, a+b=1, a, b>0).

Figure 13B:
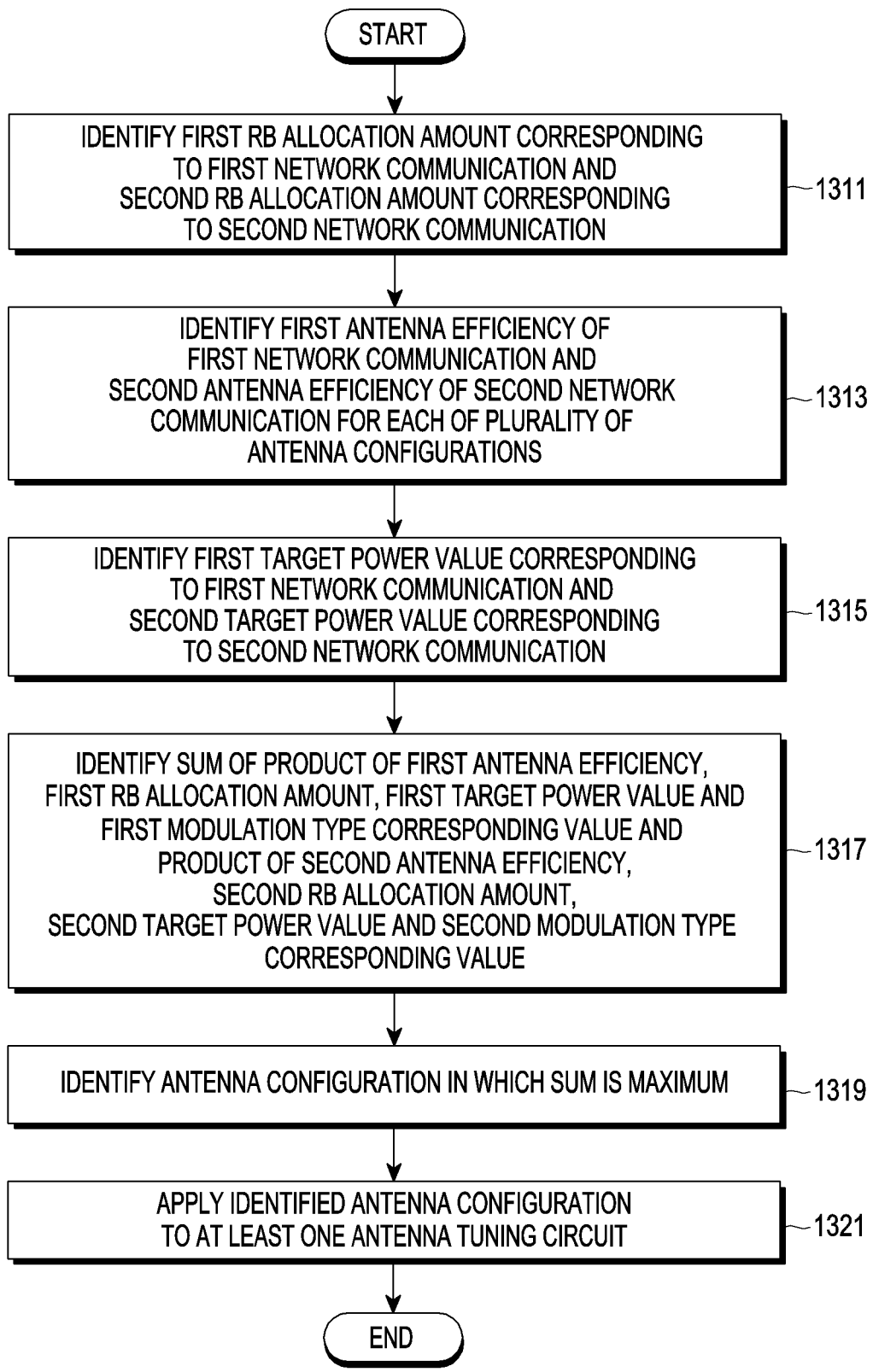
FIG. 13B is a flowchart illustrating an example operation method of an electronic device according to various embodiments.

FIG. 13B is a flowchart illustrating an example operation method of an electronic device according to various embodiments.

According to various embodiments, in operation 1311, the electronic device 101 (e.g., at least one of the processor 120, the first communication processor 212, the second communication processor 214, or the integrated communication processor 260) may identify the allocation amount of the first resource block corresponding to the first network communication and the allocation amount of the second resource block corresponding to the second network communication. For example, the allocation amount of the first resource block and the allocation amount of the second resource block may be the numbers of radio blocks (RBs) allocated by the electronic device 101 for uplink transmission from the base station via the PDCCH. In operation 1313, the electronic device 101 may identify the first antenna efficiency of the first network communication and the second antenna efficiency of the second network communication for each of a plurality of antenna configurations. For example, the electronic device 101 may identify first antenna efficiency and second antenna efficiency for each antenna configuration, as shown, for example, in Table 1. In operation 1315, the electronic device 101 may identify the first target power value corresponding to the first network communication and the second target power value corresponding to the second network communication.

According to various embodiments, in operation 1317, the electronic device 101 may identify the sum of the product of the first antenna efficiency, the first resource block allocation amount and the first modulation type corresponding value, and the product of the second antenna efficiency, the second resource block allocation amount and the second modulation type corresponding value. The first modulation type corresponding value is a number of bits that can be expressed per symbol for each modulation method (e.g., BPSK, QPSK, 8PSK, 16 QAM, and 256 QAM) used in the first network communication, and may be a modulation index. In operation 1319, the electronic device 101 may identify the antenna configuration in which the sum is the maximum. The electronic device 101 may apply the identified antenna configuration to at least one antenna tuning circuit, in operation 1321. According to various embodiments, in the process of calculating the sum of the product of the first antenna efficiency, the first resource block allocation amount, the first target power value, and the first modulation type corresponding value and the product of the second antenna efficiency, the second resource block allocation amount, the second target power value, and the second modulation type corresponding value in operation 1317, each parameter may have at least one different weight. For example, the electronic device 101 may calculate by the formula of a*(first antenna efficiency*first resource block allocation amount*first target power value*first modulation type correspondence value)+b*(second antenna efficiency*second resource block allocation amount*second target power value*second modulation type corresponding value) (however, a+b=1, a, b>0).

FIG. 14 is a table illustrating an example operation of selecting an antenna configuration to enable maximum data throughput according to various embodiments.

According to various embodiments, the electronic device 101 (e.g., at least one of the processor 120, the first communication processor 212, the second communication processor 214, or the integrated communication processor 260) may identify the product of a first target power value, a first antenna efficiency, a first resource block allocation amount, and a first modulation type corresponding value corresponding to a first network communication. The electronic device 101 may identify the product of a second target power value, a second antenna efficiency, a second resource block allocation amount, and a second modulation type corresponding value corresponding to a second network communication. The electronic device 101 may identify the sum of both products. The electronic device 101 may identify the antenna configuration in which the sum is the maximum. The electronic device 101 may apply the identified antenna configuration to at least one antenna tuning circuit.

For example, when the first target power value of the first network communication is identified to be 0 dBm (1 mW), and the second target power value is identified to be 20 dBm (100 mW), the electronic device 101 may identify that the sum 1401 corresponding to the first antenna configuration (e.g., impedance tuning circuit configuration: "1", aperture tuning circuit configuration: "a") is 18014, which is the maximum. For example, when the first target power value of the first network communication is identified to be 12 dBm, and the second target power value is identified to be 15 dBm, the electronic device 101 may identify that the sum 1402 corresponding to the first antenna configuration (e.g., impedance tuning circuit configuration: "1", aperture tuning circuit configuration: "a") is 5913.985, which is the maximum. For example, when the first target power value of the first network communication is identified to be 13 dBm, and the second target power value is identified to be 10 dBm, the electronic device 101 may identify that the sum 1403 corresponding to the first antenna configuration (e.g., impedance tuning circuit configuration: "1", aperture tuning circuit configuration: "a") is 2079.337, which is the maximum. For example, when the first target power value of the first network communication is identified to be 20 dBm, and the second target power value is identified to be 0 dBm, the electronic device 101 may identify that the sum 1404 corresponding to the third antenna configuration (e.g., impedance tuning circuit configuration: "1", aperture tuning circuit configuration: "c") is 1940.0000, which is the maximum. As described above, even when using the same band (e.g., the B2 band of LTE and the N71 band of NR), antenna configurations may be configured differently for each target power of each network communication. A large product corresponding to the resource block allocation amount and modulation method may refer, for example, to data throughput being large.

Figure 15:
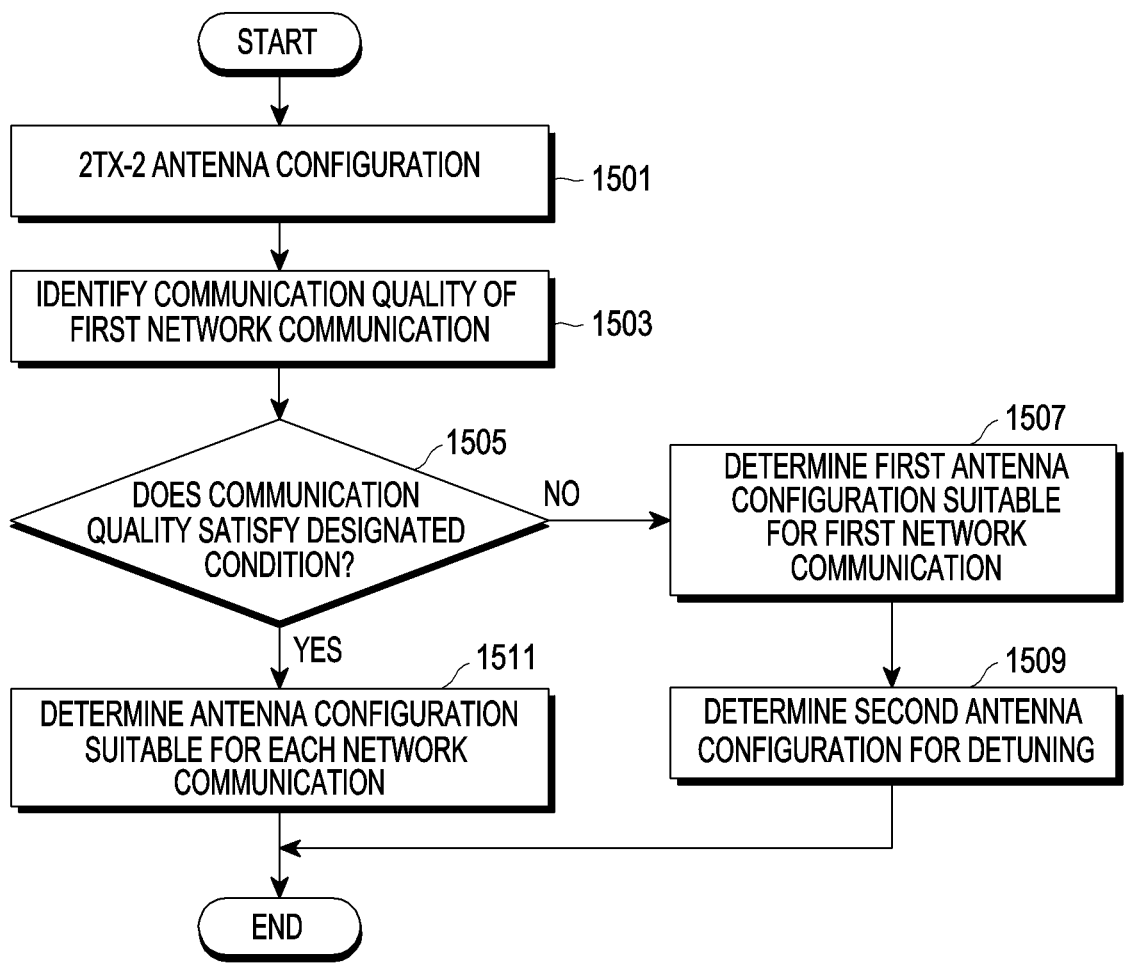
FIG. 15 is a flowchart illustrating an example operation method of an electronic device according to various embodiments.
Figure 16:
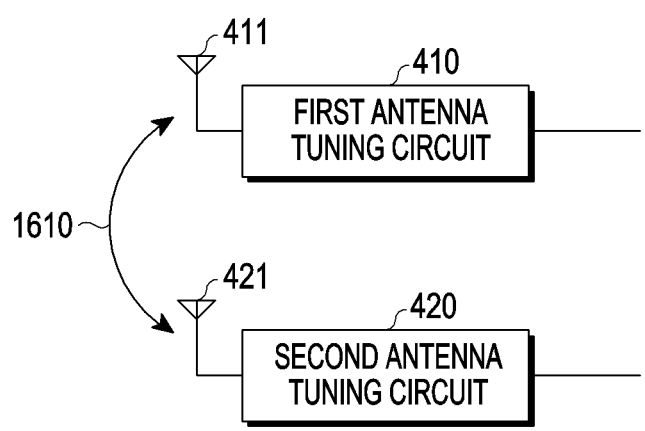
FIG. 16 is a diagram illustrating example interference between antennas according to various embodiments.

FIG. 15 is a flowchart illustrating an example operation method of an electronic device according to various embodiments. The embodiment of FIG. 15 will be described with reference to FIG. 16. FIG. 16 is a diagram illustrating example interference between antennas according to various embodiments.

According to various embodiments, the electronic device 101 (e.g., at least one of the processor 120, the first communication processor 212, the second communication processor 214, or the integrated communication processor 260) may configure a 2TX-2 antenna mode, in operation 1501. For example, the electronic device 101 may configure a first band (e.g., LTE B1 band) for a first network communication (e.g., LTE communication), and a second band (e.g., NR N78 band) for a second network communication (e.g., NR communication). The electronic device 101 may configure the first network communication to use the first antenna 411, and configure the second network communication to use the second antenna 412. The electronic device 101 may adjust the resonance characteristics of the first antenna 411 by adjusting the antenna configuration of the first antenna tuning circuit 410, and adjust the resonance characteristics of the second antenna 421 by adjusting the antenna configuration of the second antenna tuning circuit 420.

According to various embodiments, in operation 1503, the electronic device 101 may identify the communication quality of the first network communication. The electronic device 101 may identify the communication quality of the first network communication by selecting a first network communication (e.g., LTE communication) for transmitting and receiving a control signal, for example, as a control plane. In operation 1505, the electronic device 101 may identify whether the communication quality satisfies the designated condition. For example, when the transmission strength of the first network communication increases above a certain threshold (e.g., 20 dBm), the electronic device 101 may identify that the communication quality does not satisfy the designated condition. For example, when the transmission strength of the first network communication is transmitted with the maximum value, the electronic device 101 may identify that the communication quality does not satisfy the designated condition when receiving a NACK indicating failure of UL data transmission. The designated condition is not limited as long as it is a condition indicating that the communication environment of the first network communication is good.

According to various embodiments, when it is determined that the designated condition is not satisfied (1505—No), the electronic device 101 may determine a first antenna configuration suitable for the first network communication in operation 1507. If the designated condition is not satisfied, it may indicate that the communication environment of the first network communication deteriorates. For example, in FIG. 16, the electronic device 101 may apply the first antenna configuration suitable for the first network communication to the first antenna tuning circuit 410. The electronic device 101 may select an antenna configuration having the highest antenna efficiency in a first band (e.g., LTE B1 band) of the first network communication as a first antenna configuration, and apply the selected first antenna configuration to the tuning circuit 410. In operation 1509, the electronic device 101 may determine a second antenna configuration for detuning for the second network communication. For example, as illustrated in FIG. 16, signals emitted from the first antenna 411 and signals emitted from the second antenna 421 may interfere with each other (1610). In this case, in order to ensure good communication quality of the first network communication, it is necessary to mitigate interference between the signal emitted from the first antenna 411 and the signal emitted from the second antenna 421. If the resonance characteristics of the second antenna 421 are detuned, the degree of interference between the signal emitted from the first antenna 411 and the signal emitted from the second antenna 421 can be lowered. The electronic device 101 may apply an antenna configuration for detuning to the second antenna tuning circuit 420. When the second antenna tuning circuit 420 is detuned, the communication quality of the second network communication may deteriorate, but the communication quality of the first network communication can be improved. For the stability of the first network communication for the control plane, the electronic device 101 may apply the antenna configuration for detuning to the second antenna tuning circuit 420 corresponding to the second network communication.

According to various embodiments, when it is determined that the designated condition is satisfied (1505—Yes), the electronic device 101 may determine an antenna configuration suitable for each network communication in operation 1511. The electronic device 101 may select an antenna configuration having the highest antenna efficiency as a first antenna configuration in a first band (e.g., LTE B1 band) of the first network communication, and apply the selected first antenna configuration to the first antenna tuning circuit 410. The electronic device 101 may select the antenna configuration having the highest antenna efficiency as the second antenna configuration in the second band of the second network communication (e.g., NR N78 band), and apply the selected second antenna configuration to the second antenna tuning circuit 420.

According to various embodiments, although not illustrated, the electronic device 101 may determine whether to determine an antenna configuration considering both network communication, based on whether a designated service or communication (e.g., VoLTE service) is running. For example, while the VoLTE service is running, the electronic device 101 may select an antenna configuration in which the first antenna efficiency in the first network communication (e.g., LTE communication) has the maximum value. For example, the electronic device 101 may apply the antenna configuration for detuning to the second antenna tuning circuit 420 while the VOLTE service is running.

Figure 17:
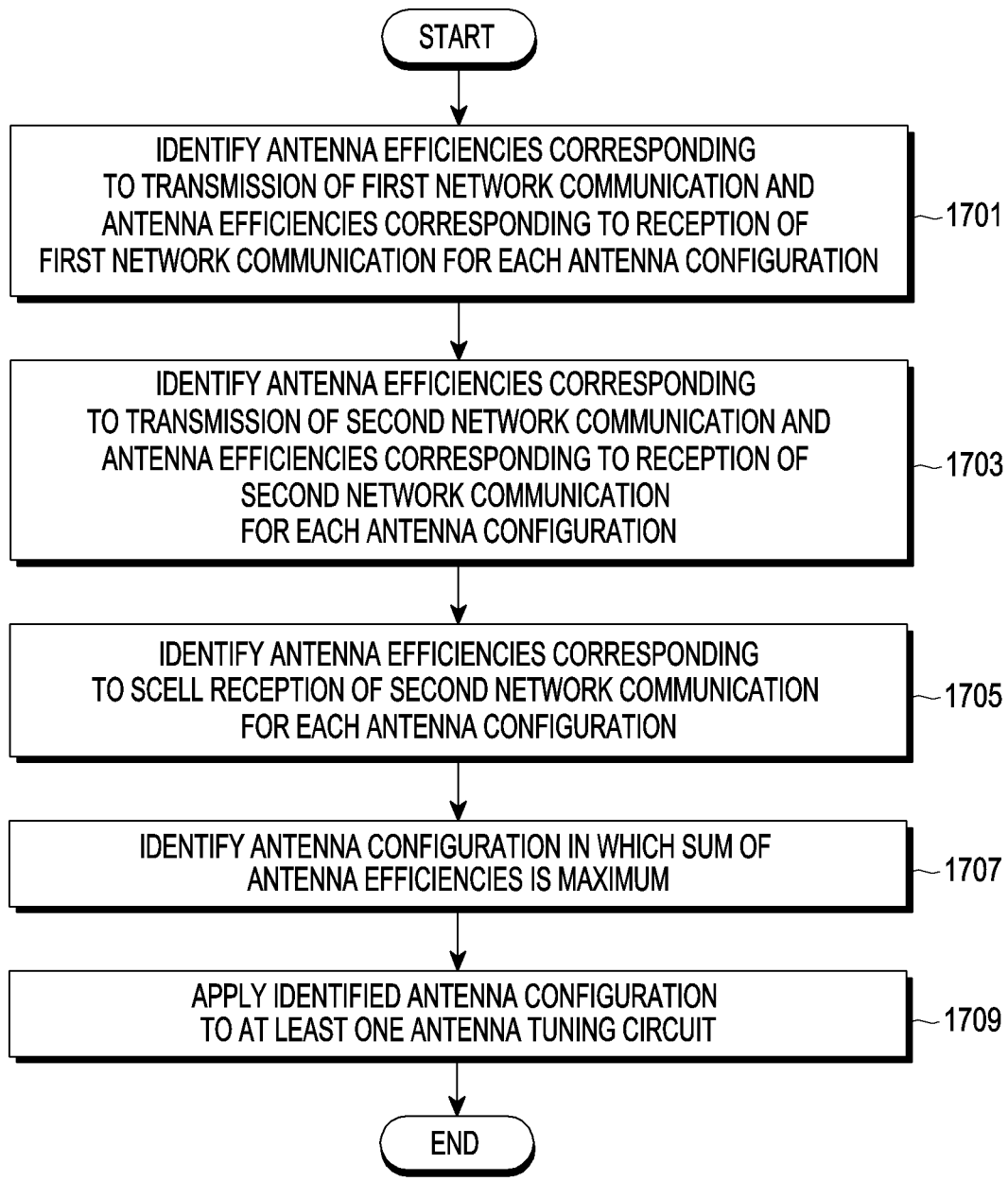
FIG. 17 is a flowchart illustrating an example operation method of an electronic device according to various embodiments.

FIG. 17 is a flowchart illustrating an example operation method of an electronic device according to various embodiments.

According to various embodiments, the electronic device 101 (e.g., at least one of the processor 120, the first communication processor 212, the second communication processor 214, or the integrated communication processor 260) may identify antenna efficiencies corresponding to the transmission of a first network communication and antenna efficiencies corresponding to the reception of the first network communication for each antenna configuration, in operation 1701.

TABLE 2

| Antenna Tuner | | Radiation/Conduction | | | | | |
|---|---|---|---|---|---|---|---|
| Impedance tuner | Apertuer tuner | N71 | | B2 | | B66 | |
| | | Tx | Rx | Tx | Rx | Rx | SUM |
| 1 | a | 0.9 | 0.8 | 0.7 | 0.8 | 0.85 | 4.05 |
| | b | 0.85 | 0.6 | 0.83 | 0.7 | 0.85 | 3.83 |
| | c | 0.7 | 0.8 | 0.8 | 0.9 | 0.8 | 4 |
| | d | 0.6 | 0.8 | 0.8 | 0.8 | 0.7 | 3.7 |
| 2 | a | 0.5 | 0.7 | 0.7 | 0.6 | 0.8 | 3.3 |
| | b | 0.4 | 0.5 | 0.5 | 0.7 | 0.6 | 2.7 |
| | c | 0.3 | 0.4 | 0.8 | 0.6 | 0.9 | 3 |
| | d | 0.2 | 0.3 | 0.9 | 0.8 | 0.7 | 2.9 |
| 3 | a | 0.1 | 0.5 | 0.7 | 0.7 | 0.8 | 2.8 |
| | b | 0.5 | 0.3 | 0.5 | 0.6 | 0.6 | 2.5 |
| | c | 0.6 | 0.7 | 0.4 | 0.45 | 0.5 | 2.65 |
| | d | 0.7 | 0.8 | 0.3 | 0.4 | 0.4 | 2.6 |
| 4 | a | 0.8 | 0.7 | 0.5 | 0.6 | 0.6 | 3.2 |
| | b | 0.4 | 0.5 | 0.8 | 0.7 | 0.9 | 3.3 |
| | c | 0.5 | 0.4 | 0.9 | 0.8 | 0.9 | 3.5 |
| | d | 0.7 | 0.6 | 0.7 | 0.7 | 0.8 | 3.5 |

For example, as illustrated in Table 2, the electronic device 101 may store the antenna efficiency (radiation/conduction) corresponding to transmission (Tx) and the antenna efficiency corresponding to reception (Rx), for each antenna configuration. The electronic device 101 may store, for example, the antenna efficiency corresponding to transmission (Tx) and the antenna efficiency corresponding to reception (Rx) for each band (e.g., N71 band, B2 band, B66 band) of network communications. The B66 band may be, for example, a band used as an Scell when a second network communication is configured with a carrier aggregation or dual connectivity system defined in 3GPP. The electronic device 101 may identify the antenna efficiencies corresponding to the transmission of a band (e.g., N71 band) used in the first network communication and the antenna efficiencies corresponding to the reception of the first network communication. In operation 1703, the electronic device 101 may identify the antenna efficiencies corresponding to the transmission of a band (e.g., B2 band) used in second network communication and the antenna efficiencies corresponding to the reception of the second network communication, for each antenna configuration. In operation 1705, the electronic device 101 may identify the antenna efficiencies corresponding to the reception of a band (e.g., a B66 band) used as an Scell of the second network communication for each antenna configuration. In operation 1707, the electronic device 101 may identify the antenna configuration in which the sum of the antenna efficiencies is the maximum. For example, the electronic device 101 may identify that the sum corresponding to the first antenna configuration (e.g., impedance tuning circuit configuration: "1", aperture tuning circuit configuration: "a") is 4.05, which is the maximum. In operation 1709, the electronic device 101 may apply the identified antenna configuration to at least one antenna tuning circuit.

Figure 18:
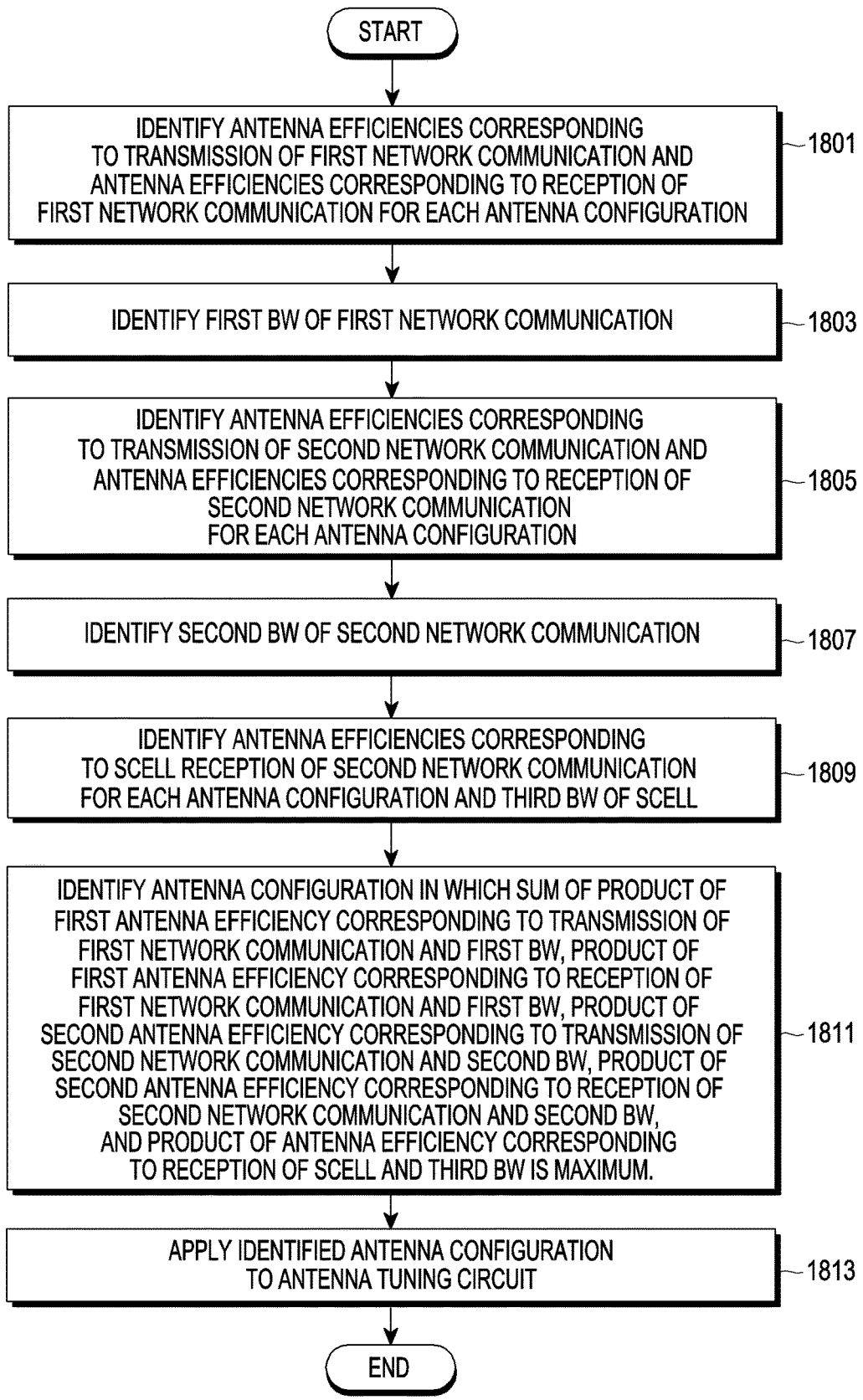
FIG. 18 is a flowchart illustrating an example operation method of an electronic device according to various embodiments.

For example, when it is determined that the consumption current does not need to be considered because the size of the transmission power is low for the bands (e.g., N71 band and B2 band) of the primary cells of the first network and the second network and the reception environment of the communication signal is good, the electronic device 101 may identify the antenna configuration via an operation as shown in FIG. 17 (or an operation as shown in FIG. 18 to be described later). For example, when the magnitude of at least one transmission power is less than or equal to the threshold power (e.g., 5 dBm) and the SNR (signal to noise ratio) of the received communication signal is greater than or equal to the threshold value, the electronic device 101 may identify the antenna configuration via the operation shown in FIG. 17, but this is exemplary and there is no limitation on the operation condition of FIG. 17.

FIG. 18 is a flowchart illustrating an example operation method of an electronic device according to various embodiments.

According to various embodiments, the electronic device 101 (e.g., at least one of the processor 120, the first communication processor 212, the second communication processor 214, or the integrated communication processor 260) may identify antenna efficiencies corresponding to the transmission of a first network communication and antenna efficiencies corresponding to the reception of the first network communication for each antenna configuration, in operation 1801. In operation 1803, the electronic device 101 may identify a first transmission bandwidth and a first reception bandwidth of the first network communication.

TABLE 3

| Antenna Tuner | | Radiation/Conduction | | | | | Bandwidth | | | |
|---|---|---|---|---|---|---|---|---|---|---|
| Impedance tuner | Apertuer tuner | N71 | | B2 | | B66 | N71 | B2 | B66 | |
| | | Tx | Rx | Tx | Rx | Rx | Mhz | Mhz | Mhz | SUM |
| 1 | a | 0.9 | 0.8 | 0.7 | 0.8 | 0.85 | 5 | 20 | 20 | 55.5 |
| | b | 0.85 | 0.6 | 0.83 | 0.7 | 0.85 | 5 | 20 | 20 | 54.85 |
| | c | 0.7 | 0.8 | 0.8 | 0.9 | 0.8 | 5 | 20 | 20 | 57.5 |
| | d | 0.6 | 0.8 | 0.8 | 0.8 | 0.7 | 5 | 20 | 20 | 53 |
| 2 | a | 0.5 | 0.7 | 0.7 | 0.6 | 0.8 | 5 | 20 | 20 | 48 |
| | b | 0.4 | 0.5 | 0.5 | 0.7 | 0.6 | 5 | 20 | 20 | 40.5 |
| | c | 0.3 | 0.4 | 0.8 | 0.6 | 0.9 | 5 | 20 | 20 | 49.5 |
| | d | 0.2 | 0.3 | 0.9 | 0.8 | 0.7 | 5 | 20 | 20 | 50.5 |
| 3 | a | 0.1 | 0.5 | 0.7 | 0.7 | 0.8 | 5 | 20 | 20 | 47 |
| | b | 0.5 | 0.3 | 0.5 | 0.6 | 0.6 | 5 | 20 | 20 | 38 |
| | c | 0.6 | 0.7 | 0.4 | 0.45 | 0.5 | 5 | 20 | 20 | 33.5 |
| | d | 0.7 | 0.8 | 0.3 | 0.4 | 0.4 | 5 | 20 | 20 | 29.5 |
| 4 | a | 0.8 | 0.7 | 0.5 | 0.6 | 0.6 | 5 | 20 | 20 | 41.5 |
| | b | 0.4 | 0.5 | 0.8 | 0.7 | 0.9 | 5 | 20 | 20 | 52.5 |
| | c | 0.5 | 0.4 | 0.9 | 0.8 | 0.9 | 5 | 20 | 20 | 56.5 |
| | d | 0.7 | 0.6 | 0.7 | 0.7 | 0.8 | 5 | 20 | 20 | 50.5 |

For example, as illustrated in Table 3, the electronic device 101 may store the antenna efficiency (radiation/conduction) corresponding to transmission (Tx) and the antenna efficiency corresponding to reception (Rx), for each antenna configuration. The electronic device 101 may identify that the bandwidth of a band (e.g., N71 band) used in a first network communication is 5 MHz. In operation 1805, the electronic device 101 may identify antenna efficiencies corresponding to the transmission of a band (e.g., B2 band) used in a second network communication and antenna efficiencies corresponding to the reception of the second network communication, for each antenna configuration. The electronic device 101 may identify that a second bandwidth of the band (e.g., B2 band) used in the second network communication is 20 MHz, in operation 1807. In operation 1809, the electronic device 101 may identify the antenna efficiencies corresponding to the reception of the band (e.g., B66 band) corresponding to the Scell of the second network communication for each antenna configuration, and identify a third bandwidth (e.g., 20 MHz) of the Scell.

According to various embodiments, in operation 1811, the electronic device 101 may identify an antenna configuration in which the sum of the product of an antenna efficiency corresponding to the transmission of the first network communication and a first bandwidth, the product of an antenna efficiency corresponding to the reception of the first network communication and the first bandwidth, the product of an antenna efficiency corresponding to the transmission of the second network communication and a second bandwidth, the product of the antenna efficiency corresponding to the reception of the second network communication and the second bandwidth, and the product of the antenna efficiency corresponding to the reception of the Scell and a third bandwidth is the maximum. For example, the electronic device 101 may identify that the sum corresponding to a third antenna configuration (e.g., impedance tuning circuit configuration: "1", aperture tuning circuit configuration: "c") is 57.5, which is the maximum. In operation 1813, the electronic device 101 may apply the identified antenna configuration to an antenna tuning circuit.

Figure 19:
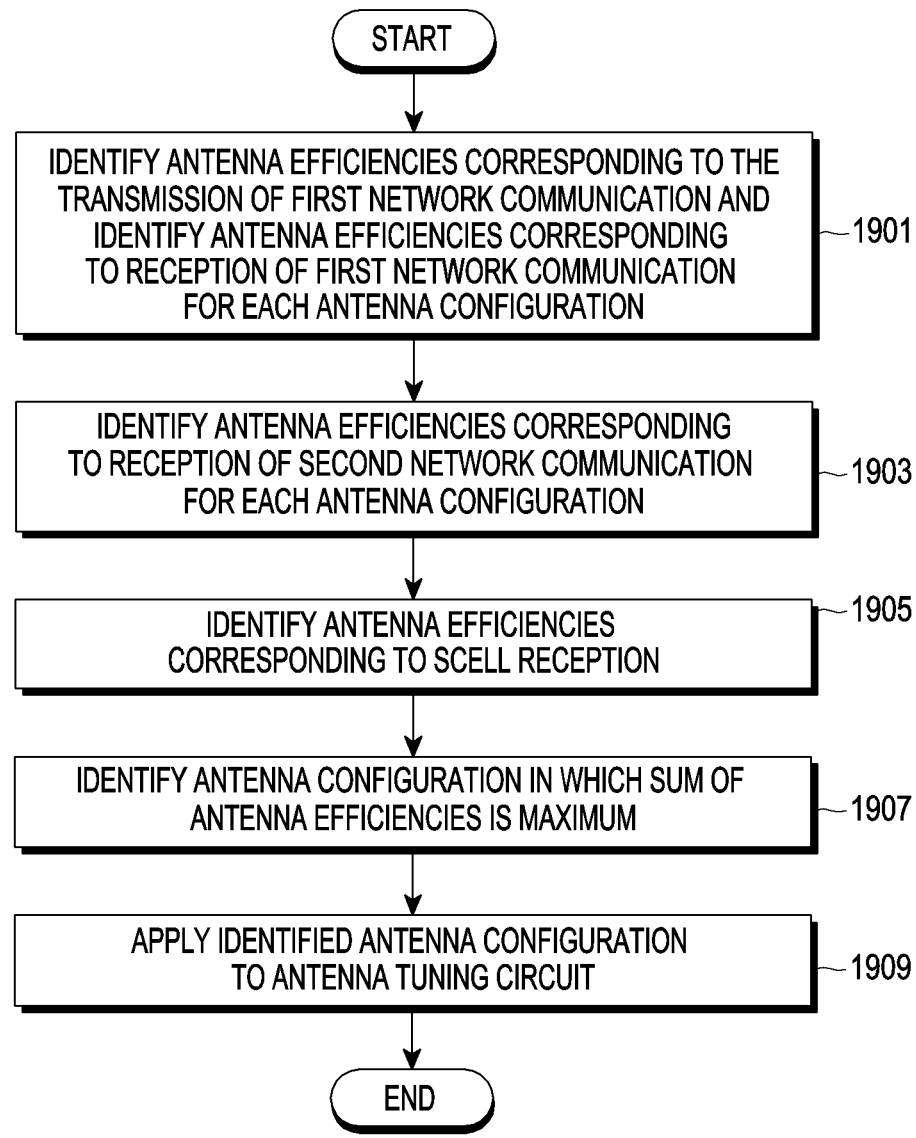
FIG. 19 is a flowchart illustrating an example operation method of an electronic device according to various embodiments.

FIG. 19 is a flowchart illustrating an example operation method of an electronic device according to various embodiments.

According to various embodiments, the electronic device 101 (e.g., at least one of the processor 120, the first communication processor 212, the second communication processor 214, or the integrated communication processor 260) may identify antenna efficiencies corresponding to the transmission of a first network communication and antenna efficiencies corresponding to the reception of the first network communication for each antenna configuration, in operation 1901.

TABLE 4

| Antenna Tuner | | Radiation/Conduction | | | | | |
|---|---|---|---|---|---|---|---|
| Impedance tuner | Apertuer tuner | N71 | | B2 | | B66 | Rx |
| | | Tx | Rx | Tx | Rx | Rx | SUM |
| 1 | a | 0.9 | 0.8 | 0.7 | 0.8 | 0.85 | 2.45 |
| | b | 0.85 | 0.6 | 0.83 | 0.7 | 0.85 | 2.15 |
| | c | 0.7 | 0.8 | 0.8 | 0.9 | 0.8 | 2.5 |
| | d | 0.6 | 0.8 | 0.8 | 0.8 | 0.7 | 2.3 |
| 2 | a | 0.5 | 0.7 | 0.7 | 0.6 | 0.8 | 2.1 |
| | b | 0.4 | 0.5 | 0.5 | 0.7 | 0.6 | 1.8 |
| | c | 0.3 | 0.4 | 0.8 | 0.6 | 0.9 | 1.9 |
| | d | 0.2 | 0.3 | 0.9 | 0.8 | 0.7 | 1.8 |
| 3 | a | 0.1 | 0.5 | 0.7 | 0.7 | 0.8 | 2 |
| | b | 0.5 | 0.3 | 0.5 | 0.6 | 0.6 | 1.5 |
| | c | 0.6 | 0.7 | 0.4 | 0.45 | 0.5 | 1.65 |
| | d | 0.7 | 0.8 | 0.3 | 0.4 | 0.4 | 1.6 |
| 4 | a | 0.8 | 0.7 | 0.5 | 0.6 | 0.6 | 1.9 |
| | b | 0.4 | 0.5 | 0.8 | 0.7 | 0.9 | 2.1 |
| | c | 0.5 | 0.4 | 0.9 | 0.8 | 0.9 | 2.1 |
| | d | 0.7 | 0.6 | 0.7 | 0.7 | 0.8 | 2.1 |

For example, as illustrated in Table 4, the electronic device 101 may store the antenna efficiency (radiation/conduction) corresponding to transmission (Tx) and the antenna efficiency corresponding to reception (Rx), for each antenna configuration. The electronic device 101 may store the antenna efficiency corresponding to transmission (Tx) and the antenna efficiency corresponding to reception (Rx), for each band (e.g., N71 band, B2 band, B66 band) of the network communications. The B66 band may be, for example, a band used as an Scell when the second network communication operates with carrier aggregation or dual connectivity defined in 3GPP. The electronic device 101 may identify the antenna efficiency corresponding to the reception of the first network communication in the band (e.g., N71 band) used in the first network communication. In operation 1903, the electronic device 101 may identify the antenna efficiency corresponding to the reception of the second network communication of the band (e.g., B2 band) used in the second network communication for each antenna configuration. In operation 1905, the electronic device 101 may identify the antenna efficiencies corresponding to reception of the band (e.g., B66 band) used as an Scell of the second network communication for each antenna configuration. In operation 1907, the electronic device 101 may identify the antenna configuration in which the sum of the antenna efficiencies is the maximum. For example, the electronic device 101 may identify that the sum corresponding to a third antenna configuration (e.g., impedance tuning circuit configuration: "1", aperture tuning circuit configuration: "c") is 2.5, which is the maximum. In operation 1909, the electronic device 101 may apply the identified antenna configuration to the antenna tuning circuit.

For example, when the consumption current does not need to be considered because the magnitude of the transmission power is low and the reception environment of the communication signal is determined to be poor, the electronic device 101 may identify the antenna configuration by an operation shown in FIG. 19 (or operation shown in FIG. 20 to be described later). For example, when the magnitude of the at least one transmission power is less than or equal to the threshold power (e.g., 5 dBm) and the signal to noise ratio (SNR) of the received communication signal is less than the threshold value, the electronic device 101 may identify the antenna configuration by the same operation as in FIG. 19, but this is exemplary and there is no limitation in the operating conditions of FIG. 19.

Figure 20:
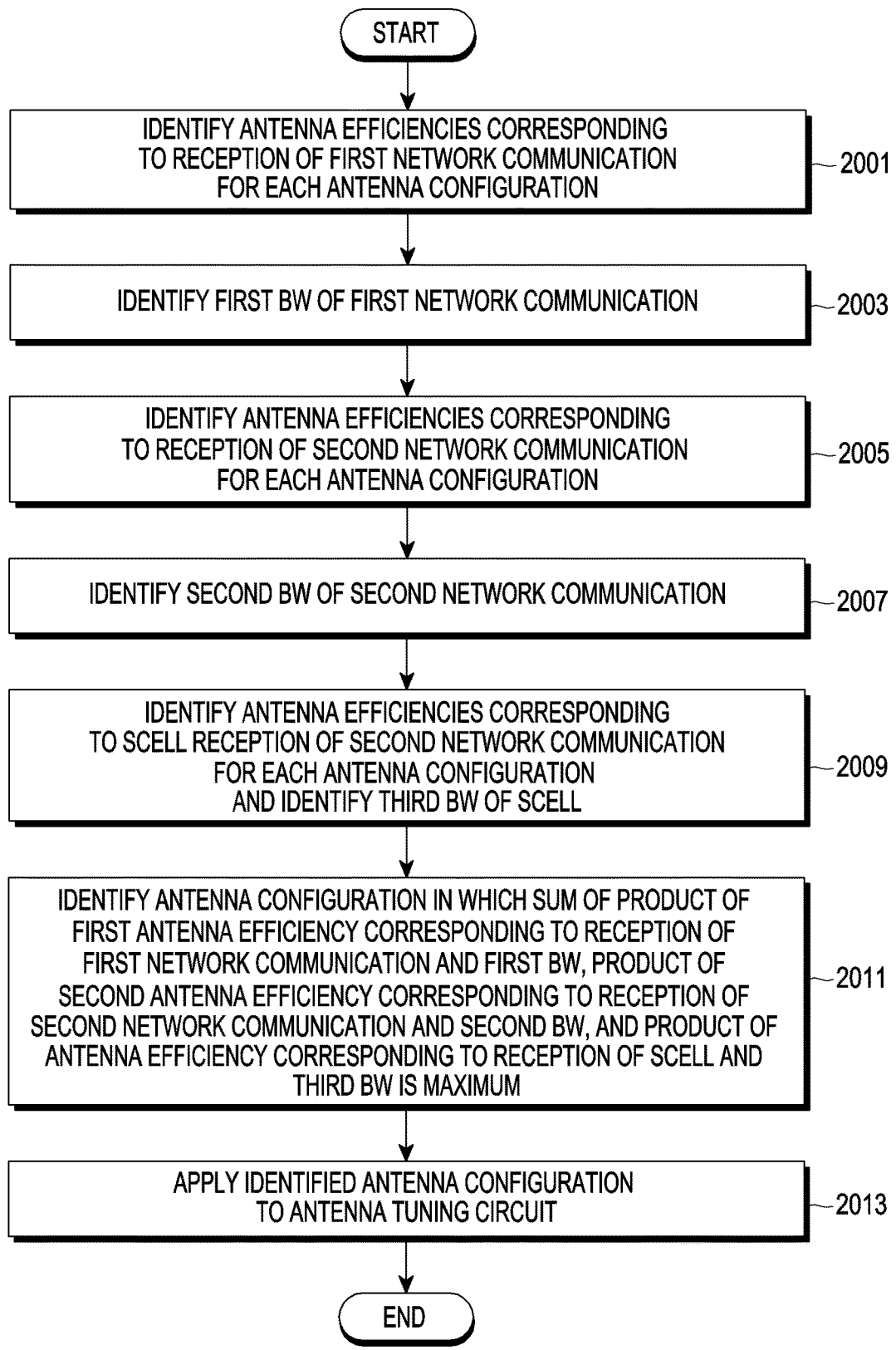
FIG. 20 is a flowchart illustrating an example operation method of an electronic device according to various embodiments.

FIG. 20 is a flowchart illustrating an example operation method of an electronic device according to various embodiments.

According to various embodiments, the electronic device 101 (e.g., at least one of the processor 120, the first communication processor 212, the second communication processor 214, or the integrated communication processor 260) may identify antenna efficiencies corresponding to the reception of a first network communication for each antenna configuration, in operation 2001. In operation 2003, the electronic device 101 may identify a first bandwidth of the first network communication.

TABLE 5

| Antenna Tuner | | Radiation/Conduction | | | | | Bandwidth | | | |
|---|---|---|---|---|---|---|---|---|---|---|
| | | N71 | | B2 | | B66 | N71 | B2 | B66 | |
| Impedance tuner | Apertuer tuner | Tx | Rx | Tx | Rx | Rx | Mhz | Mhz | Mhz | SUM |
| 1 | a | 0.9 | 0.8 | 0.7 | 0.8 | 0.85 | 5 | 20 | 20 | 37 |
|   | b | 0.85 | 0.6 | 0.83 | 0.7 | 0.85 | 5 | 20 | 20 | 34 |
|   | c | 0.7 | 0.8 | 0.8 | 0.9 | 0.8 | 5 | 20 | 20 | 36 |
|   | d | 0.6 | 0.8 | 0.8 | 0.8 | 0.7 | 5 | 20 | 20 | 34 |
| 2 | a | 0.5 | 0.7 | 0.7 | 0.6 | 0.8 | 5 | 20 | 20 | 31.5 |
|   | b | 0.4 | 0.5 | 0.5 | 0.7 | 0.6 | 5 | 20 | 20 | 28.5 |
|   | c | 0.3 | 0.4 | 0.8 | 0.6 | 0.9 | 5 | 20 | 20 | 32 |
|   | d | 0.2 | 0.3 | 0.9 | 0.8 | 0.7 | 5 | 20 | 20 | 31.5 |
| 3 | a | 0.1 | 0.5 | 0.7 | 0.7 | 0.8 | 5 | 20 | 20 | 32.5 |
|   | b | 0.5 | 0.3 | 0.5 | 0.6 | 0.6 | 5 | 20 | 20 | 25.5 |
|   | c | 0.6 | 0.7 | 0.4 | 0.45 | 0.5 | 5 | 20 | 20 | 22.5 |
|   | d | 0.7 | 0.8 | 0.3 | 0.4 | 0.4 | 5 | 20 | 20 | 20 |
| 4 | a | 0.8 | 0.7 | 0.5 | 0.6 | 0.6 | 5 | 20 | 20 | 27.5 |
|   | b | 0.4 | 0.5 | 0.8 | 0.7 | 0.9 | 5 | 20 | 20 | 34.5 |
|   | c | 0.5 | 0.4 | 0.9 | 0.8 | 0.9 | 5 | 20 | 20 | 36 |
|   | d | 0.7 | 0.6 | 0.7 | 0.7 | 0.8 | 5 | 20 | 20 | 33 |

For example, as illustrated in Table 5, the electronic device 101 may store the antenna efficiency (radiation/conduction) corresponding to transmission (Tx) and the antenna efficiency corresponding to reception (Rx), for each antenna configuration. The electronic device 101 may store the antenna efficiency corresponding to transmission (Tx) and the antenna efficiency corresponding to reception (Rx), for each band (e.g., N71 band, B2 band, B66 band) of the network communications. The B66 band may be, for example, a band used as an Scell. The electronic device 101 may identify the antenna efficiency corresponding to the reception of the first network communication in the band (e.g., N71 band) used in the first network communication. The electronic device 101 may identify a first bandwidth (e.g., 5 MHz) of the band (e.g., N71 band) used in the first network communication.

According to various embodiments, in operation 2005, the electronic device 101 may identify the antenna efficiencies corresponding to the reception of the second network communication of the band (e.g., B2 band) used in the second network communication for each antenna configuration. In operation 2007, the electronic device 101 may identify a second bandwidth (e.g., 20 MHz) of the band (e.g., B2 band) used in the second network communication for each antenna configuration. In operation 2009, the electronic device 101 may identify the antenna efficiencies corresponding to the reception of the band (e.g., B66 band) used as an Scell of the second network communication for each antenna configuration and a third bandwidth (e.g., 20 MHz). In operation 2011, the electronic device 101 may identify the antenna configuration in which the sum of the product of the antenna efficiency corresponding to the reception of the first network communication and the first BW, the product of the antenna efficiency corresponding to the reception of the second network communication and the second BW, and the product of the antenna efficiency corresponding to the reception of the Scell and the third BW is the maximum. For example, the electronic device 101 may identify that the sum corresponding to a first antenna configuration (e.g., impedance tuning circuit configuration: "1", aperture tuning circuit configuration: "a") is 37, which is the maximum. In operation 2013, the electronic device 101 may apply the identified antenna configuration to the antenna tuning circuit.

An electronic device according to various example embodiments may include at least one communication processor configured to support a plurality of network communications, a shared antenna configured to transmit at least one communication signal corresponding to the plurality of network communications, an antenna tuning circuit configured to adjust resonance characteristics of the shared antenna, and a memory configured to store a plurality of antenna configurations to be applied to the antenna tuning circuit, wherein the at least one communication processor may be configured to: identify a plurality of target power values corresponding to the plurality of network communications, respectively; identify a first antenna configuration of the antenna tuning circuit to maximize the antenna efficiency among the plurality of antenna configurations stored in the memory based on the at least one communication signal being transmitted through the shared antenna, based on the plurality of target power values; and apply the first antenna configuration to the antenna tuning circuit.

According to various example embodiments, the at least one communication processor may be configured to identify a first band to be used among a plurality of bands corresponding to the first network communication among the plurality of network communications, and identify a second band to be used among a plurality of bands corresponding to the second network communication among the plurality of network communications.

According to various example embodiments, the at least one communication processor may be configured to identify a plurality of first antenna efficiencies corresponding to a plurality of antenna configurations of the antenna tuning circuit in the first band, respectively, and identify a plurality of second antenna efficiencies corresponding to the plurality of antenna configurations of the antenna tuning circuit in the second band, respectively.

According to various example embodiments, the at least one communication processor may be configured to: identify a plurality of first values obtained by multiplying the first target power value for each of the plurality of the first antenna efficiencies corresponding to the plurality of antenna configurations, respectively, identify a plurality of second values obtained by multiplying the second target power value for each of the plurality of second antenna efficiencies corresponding to the plurality of antenna configurations, respectively, identify a plurality of sums obtained by summing the plurality of first values and the plurality of second values, respectively, for the plurality of antenna configurations, and identify the maximum value among the plurality of sums and identify the antenna configuration corresponding to the maximum value as the first antenna configuration.

According to various example embodiments, the at least one communication processor may be configured to: identify a first bandwidth corresponding to the first network communication and a second bandwidth corresponding to the second network communication, identify a plurality of third values obtained by multiplying the first target power value and the first bandwidth for each of the plurality of the first antenna efficiencies corresponding to the plurality of antenna configurations, respectively, identify a plurality of fourth values obtained by multiplying the second target power value and the second bandwidth for each of the plurality of the second antenna efficiencies corresponding to the plurality of antenna configurations, respectively, identify a plurality of sums obtained by summing the plurality of third values and the plurality of fourth values, respectively, for the plurality of antennal configurations, and identify the maximum value among the plurality of sums and identify the antenna configuration corresponding to the maximum value as the first antenna configuration.

According to various example embodiments, the at least one communication processor may be configured to: identify the communication quality of the first network communication for a control plane among the plurality of network communications, identify whether the communication quality satisfies a designated condition indicating that the communication environment of the first network communication is deteriorated, and apply the first antenna configuration to minimize the power consumption to the antenna tuning circuit based on the designated condition not being satisfied.

According to various example embodiments, the at least one communication processor may be configured to: apply a second antenna configuration to the antenna tuning circuit such that the antenna efficiency corresponding to the first network communication has a maximum value, or apply a third antenna configuration to the antenna tuning circuit such that the antenna efficiency corresponding to the remaining network communication except the first network communication has a maximum value among the at least one antenna configuration included in the headroom of the first network communication.

According to various example embodiments, the at least one communication processor may be configured to: identify whether a designated service of the first network communication for providing the designated service among the plurality of network communications is provided, and apply the first antenna configuration to minimize the power consumption to the antenna tuning circuit, based on the designated service not being provided.

According to various example embodiments, the at least one communication processor may be configured to: based on the designated service being provided, apply a second antenna configuration to the antenna tuning circuit such that the antenna efficiency corresponding to the first network communication has a maximum value, or apply a fourth antenna configuration to the antenna tuning circuit such that the antenna efficiency corresponding to the remaining network communication except the first network communication has a maximum value among the at least one antenna configuration included in the headroom of the first network communication.

According to various example embodiments, the electronic device may further include another antenna different from the shared antenna, and another antenna tuning circuit configured to adjust the resonance characteristics of the another antenna, wherein the at least one communication processor is configured, based on identifying that the plurality of network communications do not use the shared antenna, to: identify to transmit a first at least one communication signal corresponding to the first network communication among the plurality of network communications through the shared antenna; and identify to transmit a second at least one communication signal corresponding to the second network communication among the plurality of network communications through the another antenna.

According to various example embodiments, the at least one communication processor may be configured to: identify the communication quality of the first network communication for a control plane, identify whether the communication quality satisfies a designated condition indicating that the communication environment of the first network communication is deteriorated, and apply a fifth antenna configuration to minimize the power consumption by the first network communication to the antenna tuning circuit and apply a sixth antenna configuration to minimize the power consumption by the second network communication to the another antenna tuning circuit, based on the designated condition not being satisfied.

According to various example embodiments, the at least one communication processor may be configured, based on the designated condition being satisfied, to: apply the fifth antenna configuration to minimize the power consumption by the first network communication to the antenna tuning circuit, and apply a seventh antenna configuration for detuning the resonance characteristics of the second network communication to the another antenna tuning circuit.

According to various example embodiments, an electronic device may include at least one communication processor configured to support a plurality of network communications, a shared antenna configured to transmit at least one communication signal corresponding to the plurality of network communications, an antenna tuning circuit configured to adjust resonance characteristics of the shared antenna, and a memory configured to store a plurality of antenna configurations applied to the antenna tuning circuit, wherein the at least one communication processor is configured to: identify a plurality of resource blocks for a designated period corresponding to the plurality of network communication, respectively, identify a first antenna configuration of the antenna tuning circuit to maximize the data throughput among the plurality of antenna configurations stored in the memory, based on the at least one communication signal being transmitted through the shared antenna, based on the plurality of resource blocks, and apply the first antenna configuration to the antenna tuning circuit.

According to various example embodiments, the at least one communication processor is configured to: identify a first band to be used among a plurality of bands corresponding to the first network communication among the plurality of network communications, and identify a second band to be used among a plurality of bands corresponding to the second network communication among the plurality of network communications.

According to various example embodiments, the at least one communication processor is configured to: identify a plurality of first antenna efficiencies corresponding to a plurality of antenna configurations of the antenna tuning circuit in the first band, respectively, identify a plurality of second antenna efficiencies corresponding to the plurality of antenna configurations of the antenna tuning circuit in the second band, respectively, and identify a first modulation index corresponding to the first network communication and a second modulation index corresponding to the second network communication.

According to various example embodiments, the at least one communication processor may be configured to: identify a plurality of first values obtained by multiplying a first resource block allocation amount and the first modulation index for each of the plurality of first antennal efficiencies corresponding to the plurality of antenna configurations, respectively, identify a plurality of second values obtained by multiplying a second resource block allocation amount and the second modulation index for each of the plurality of second antennal efficiencies corresponding to the plurality of antenna configurations, respectively, identify a plurality of sums obtained by summing the plurality of first values and the plurality of second values, respectively, for the plurality of antenna configurations, and identify the maximum value among the plurality of sums and identify the antenna configuration corresponding to the maximum value as the first antenna configuration.

According to various example embodiments, the at least one communication processor may be configured to: identify a first target power value of the first network communication and a second target power value of the second network communication, identify a plurality of third values obtained by multiplying the first resource block allocation amount, the first modulation index and the first target power value for each of the plurality of first antenna efficiencies corresponding to the plurality of antenna configurations, respectively, identify a plurality of fourth values obtained by multiplying the second resource block allocation amount, the second modulation index and the second target power value for each of the plurality of second antenna efficiencies corresponding to the plurality of antenna configurations, respectively, identify a plurality of sums obtained by summing the plurality of third values and the plurality of fourth values, respectively, for the plurality of antenna configurations, and identify the maximum value among the plurality of sums and identify an antenna configuration corresponding to the maximum value as the first antenna configuration.

According to various example embodiments, the at least one communication processor may be configured to: identify the communication quality of the first network communication for a control plane among the plurality of network communications, identify whether the communication quality satisfies a designated condition indicating that the communication environment of the first network communication is deteriorated, and apply a first antenna configuration to minimize the power consumption to the antenna tuning circuit, based on the designated condition not being satisfied.

According to various example embodiments, based on the designated condition being satisfied, the at least one communication processor may be configured to: apply a second antenna configuration to the antenna tuning circuit such that the antenna efficiency corresponding to the first network communication has the maximum value, or apply a third antenna configuration to the antenna tuning circuit such that the antenna efficiency corresponding to the remaining network communication except the first network communication has a maximum value among the at least one antenna configuration included in the headroom of the first network communication.

According to various example embodiments, the at least one communication processor may be configured to identify whether a designated service of the first network communication for providing the designated service among the plurality of network communications is provided, apply the first antenna configuration to minimize the power consumption to the antenna tuning circuit, based on the designated service not being provided, wherein the at least one communication processor is configured to, based on the designated service being provided, apply a second antenna configuration to the antenna tuning circuit such that the antenna efficiency corresponding to the first network communication has a maximum value, or apply a fourth antenna configuration to the antenna tuning circuit such that the antenna efficiency corresponding to the remaining network communication except the first network communication has a maximum value among the at least one antenna configuration included in the headroom of the first network communication.

The electronic device according to various embodiments may be one of various types of electronic devices. The electronic devices may include, for example, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., a master device or a task performing device) that is readable by a machine (e.g., the electronic device 101). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood that the various example embodiments are intended to be illustrative, not limiting. It will be further understood by one of ordinary skill in the art that various changes in form and detail may be made without departing from the true spirit and full scope of the disclosure, including the appended claims and equivalents thereof.

What is claimed is:

1. An electronic device comprising:
   at least one communication processor configured to support a plurality of network communications;
   a shared antenna configured to transmit at least one communication signal corresponding to the plurality of network communications;
   an antenna tuning circuit configured to adjust resonance characteristics of the shared antenna; and
   a memory configured to store a plurality of antenna configurations to be applied to the antenna tuning circuit,
   wherein the at least one communication processor is configured to:
      identify a first band to be used among a plurality of bands corresponding to a first network communication among the plurality of network communications and a second band to be used among a plurality of bands corresponding to a second network communication among the plurality of network communications using the shared antenna;
      identify, among the plurality of antenna configurations stored in the memory, a first antenna configuration to be applied to of the antenna tuning circuit to reduce power consumption associated with both the first band and the second band using the shared antenna; and
      apply the first antenna configuration to the antenna tuning circuit to concurrently transmit the at least one communication signal corresponding to each of the first band and the second band using the shared antenna.

2. The electronic device of claim 1, wherein the at least one communication processor is configured to:
   identify a plurality of first antenna efficiencies corresponding to a plurality of antenna configurations of the antenna tuning circuit in the first band, respectively; and
   identify a plurality of second antenna efficiencies corresponding to the plurality of antenna configurations of the antenna tuning circuit in the second band, respectively.

3. The electronic device of claim 2, wherein the at least one communication processor is configured to:
   identify a plurality of first values obtained by multiplying a first target power value for each of the plurality of the first antenna efficiencies corresponding to the plurality of antenna configurations, respectively;
   identify a plurality of second values obtained by multiplying a second target power value for each of the plurality of second antenna efficiencies corresponding to the plurality of antenna configurations, respectively;
   identify a plurality of sums obtained by summing the plurality of first values and the plurality of second values, respectively, for the plurality of antenna configurations; and
   identify a maximum value among the plurality of sums and identify the antenna configuration corresponding to the maximum value as the first antenna configuration.

4. The electronic device of claim 2, wherein the at least one communication processor is configured to:
   identify a first bandwidth corresponding to the first network communication and a second bandwidth corresponding to the second network communication;
   identify a plurality of third values obtained by multiplying a first target power value and the first bandwidth for each of the plurality of the first antenna efficiencies corresponding to the plurality of antenna configurations, respectively;
   identify a plurality of fourth values obtained by multiplying a second target power value and the second bandwidth for each of the plurality of the first antenna efficiencies corresponding to the plurality of antenna configurations, respectively;
   identify a plurality of sums obtained by summing each of the plurality of third values and each of the plurality of fourth values, for each of the plurality of antenna configurations; and
   identify a maximum value among the plurality of sums and identify the antenna configuration corresponding to the maximum value as the first antenna configuration.

5. The electronic device of claim 1, wherein the at least one communication processor is configured to:
- identify a communication quality of the first network communication for a control plane among the plurality of network communications;
- identify whether the communication quality satisfies a designated condition indicating that the communication environment of the first network communication is deteriorated; and
- apply the first antenna configuration to reduce the power consumption of the antenna tuning circuit among the plurality of antenna configurations, based on the designated condition not being satisfied.

6. The electronic device of claim 5, wherein, based on the designated condition being satisfied, the at least one communication processor is configured to:
- apply a second antenna configuration to the antenna tuning circuit such that the antenna efficiency corresponding to the first network communication has a maximum value; or
- apply a third antenna configuration to the antenna tuning circuit such that the antenna efficiency corresponding to a remaining network communication other than the first network communication has a maximum value among the at least one antenna configuration included in a headroom of the first network communication.

7. The electronic device of claim 1, wherein the at least one communication processor is configured to:
- identify whether a designated service of the first network communication for providing the designated service among the plurality of network communications is provided; and
- apply the first antenna configuration to reduce the power consumption to the antenna tuning circuit among the plurality of antenna configurations, based on the designated service not being provided.

8. The electronic device of claim 7, wherein, based on the designated service being provided, the at least one communication processor is configured to:
- apply a second antenna configuration to the antenna tuning circuit such that the antenna efficiency corresponding to the first network communication has a maximum value; or
- apply a fourth antenna configuration to the antenna tuning circuit such that the antenna efficiency corresponding to a remaining network communication other than the first network communication has a maximum value among the at least one antenna configuration included in the headroom of the first network communication.

9. The electronic device of claim 1, further comprising:
- another antenna different from the shared antenna; and
- another antenna tuning circuit configured to adjust resonance characteristics of the another antenna,
- wherein, based on identifying that the plurality of network communications do not use the shared antenna, the at least one communication processor is configured to:
- identify to transmit a first at least one communication signal corresponding to the first network communication among the plurality of network communications through the shared antenna; and
- identify to transmit a second at least one communication signal corresponding to the second network communication among the plurality of network communications through the another antenna.

10. The electronic device of claim 9, wherein the at least one communication processor is configured to:
- identify a communication quality of the first network communication for a control plane;
- identify whether the communication quality satisfies a designated condition indicating that the communication environment of the first network communication is deteriorated; and
- apply a fifth antenna configuration to minimize the power consumption by the first network communication to the antenna tuning circuit and apply a sixth antenna configuration to minimize the power consumption by the second network communication to the another antenna tuning circuit, based on the designated condition not being satisfied.

11. The electronic device of claim 10, wherein, based on the designated condition being satisfied, the at least one communication processor is configured to:
- apply the fifth antenna configuration to minimize the power consumption by the first network communication to the antenna tuning circuit, and apply a seventh antenna configuration for detuning resonance characteristics of the second network communication to the another antenna tuning circuit.

* * * * *